(12) United States Patent
Yu et al.

(10) Patent No.: US 11,588,540 B2
(45) Date of Patent: Feb. 21, 2023

(54) OPPORTUNISTIC BEAM REACQUISITION

(71) Applicant: Intel Corporation, Santa Clara, CA (US)

(72) Inventors: Zhibin Yu, Unterhaching (DE); Michael Ruder, Pommelsbrunn (DE)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/973,773

(22) PCT Filed: Sep. 6, 2019

(86) PCT No.: PCT/US2019/049835
§ 371 (c)(1),
(2) Date: Dec. 10, 2020

(87) PCT Pub. No.: WO2020/076442
PCT Pub. Date: Apr. 16, 2020

(65) Prior Publication Data
US 2021/0258066 A1 Aug. 19, 2021

(30) Foreign Application Priority Data
Oct. 8, 2018 (EP) .................................... 18199163

(51) Int. Cl.
*H04B 7/08* (2006.01)
*H04W 76/19* (2018.01)
(Continued)

(52) U.S. Cl.
CPC ........... *H04B 7/088* (2013.01); *H04B 7/0617* (2013.01); *H04W 24/10* (2013.01); *H04W 56/001* (2013.01); *H04W 76/19* (2018.02)

(58) Field of Classification Search
CPC ..... H04B 7/088; H04B 7/0617; H04W 24/10; H04W 56/001; H04W 76/19
See application file for complete search history.

(56) References Cited

U.S. PATENT DOCUMENTS

2006/0241884 A1* 10/2006 Sathe ...................... H04L 43/50
702/108
2019/0007857 A1* 1/2019 Shimoshimano ..... H04L 5/0037

FOREIGN PATENT DOCUMENTS

WO 2015109153 A1 7/2015

OTHER PUBLICATIONS

International Search Report based on PCT Application No. PCT/US2019/049835 (4 pages) dated Nov. 25, 2019 (for informational purpose only).

(Continued)

*Primary Examiner* — Fred A Casca
(74) *Attorney, Agent, or Firm* — Viering, Jentschura & Partner mbB

(57) ABSTRACT

Herein is disclosed a wireless communication device comprising two or more antennas; one or more transceivers, configured to process wireless signal for one or more processors received via the two or more antennas; and one or more processors, configured to determine a timing of data transmissions within the wireless signal; determine a timing of intervals between beam selection protocol transmissions in the wireless signal; determine a testing period corresponding to an overlap of one data transmission selected from the data transmissions and one interval of the intervals; and measure a signal quality of the selected data transmission during the testing period using a candidate receive-beam setting from a plurality of predefined receive-beam settings for receiving the wireless signals via the two or more antennas.

22 Claims, 11 Drawing Sheets

(51) Int. Cl.
   *H04B 7/06* (2006.01)
   *H04W 24/10* (2009.01)
   *H04W 56/00* (2009.01)

(56) References Cited

OTHER PUBLICATIONS

Mediatek Inc, "The needs of Measurement Gap in NR", Oct. 2017 6 pages, 3GPP TSG-RAN WG4 Meeting #84bis, Dubrovnik, Croatia.

Samsung, "Further Discussion on Measurement Gap for Intra-Frequency Measurement", Oct. 2017, 6 page, 3GPP TSG-RAN WG4 Meeting #84bis, Dubrovnik, Croatia.

* cited by examiner

OPPORTUNISTIC BEAM REACQUISITION

CROSS-REFERENCE TO RELATED APPLICATIONS

This is a national phase application of PCT/US2019/049835, which claims priority to European Patent Application 18 199 163.9, filed on Oct. 8, 2018, the entirety of which is herein incorporated herein by reference.

TECHNICAL FIELD

Various embodiments relate generally to methods and devices for beam selection in a mobile device.

BACKGROUND

Standards and discussions for 5th Generation Wireless technology ("5G") include procedures for selection of transmit-beams for transmissions from a base station to a mobile device, as well as selection of receive-beams for receipt of these transmissions. Such selection of transmit-beams may be referred to as Downlink (DL) Beam Management (BM). A goal of Beam Management is to find a best beam pair between the transmit antennas of the base station and the receive antennas of the user equipment. The standards do not prescribe a specific beam management method, but rather provide a flexibility in the implementation of BM. The known methods of beam management may be undesirable for certain circumstances, such as when the user device undergoes a change in direction or location.

SUMMARY

Herein is disclosed a wireless communication device comprising two or more antennas; one or more transceivers, configured to process wireless signal for one or more processors received via the two or more antennas; and one or more processors, configured to determine a timing of data transmissions within the wireless signal; determine a timing of intervals between beam selection protocol transmissions in the wireless signal; determine a testing period corresponding to an overlap of one data transmission selected from the data transmissions and one interval of the intervals; and measure a signal quality of the selected data transmission during the testing period using a candidate receive-beam setting from a plurality of predefined receive-beam settings for receiving the wireless signals via the two or more antennas.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the Disclosure. In the following description, various aspects of the Disclosure are described with reference to the following drawings, in which.

DESCRIPTION

Figure 1A:
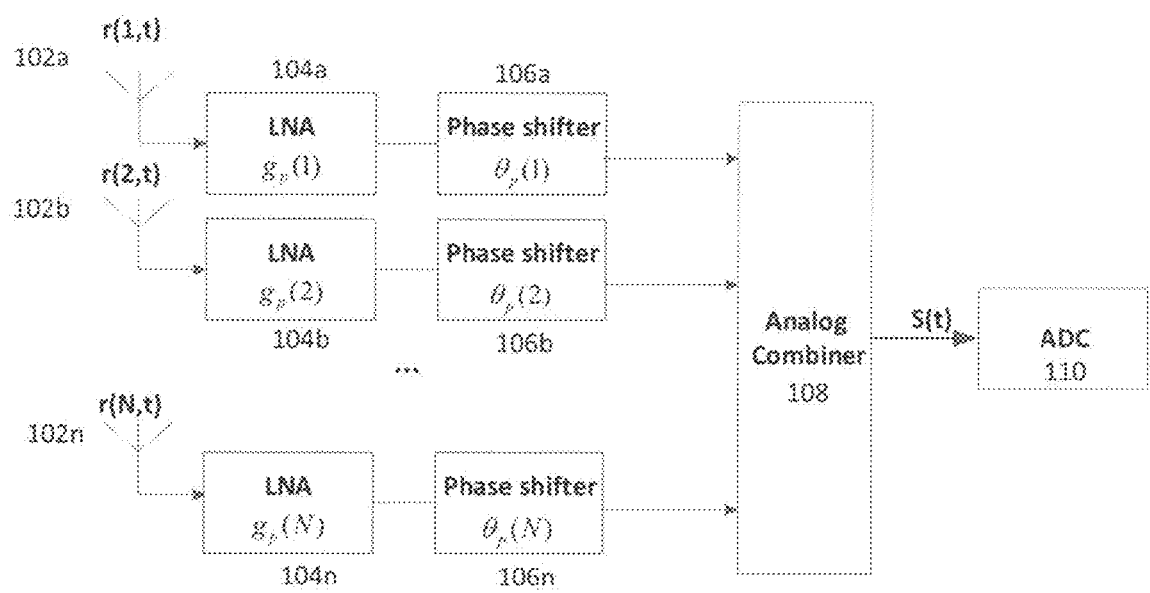
FIG. 1A shows an analog beamforming system for a receive-beam.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

It is appreciated that any vector and/or matrix notation utilized herein is exemplary in nature and is employed solely for purposes of explanation. Accordingly, it is understood that the approaches detailed in this disclosure are not limited to being implemented solely using vectors and/or matrices, and that the associated processes and computations may be equivalently performed with respect to sets, sequences, groups, etc., of data, observations, information, signals, samples, symbols, elements, etc. Furthermore, it is appreciated that references to a "vector" may refer to a vector of any size or orientation, e.g. including a 1×1 vector (e.g. a scalar), a 1×M vector (e.g. a row vector), and an M×1 vector (e.g. a column vector). Similarly, it is appreciated that references to a "matrix" may refer to matrix of any size or orientation, e.g. including a 1×1 matrix (e.g. a scalar), a 1×M matrix (e.g. a row vector), and an M×1 matrix (e.g. a column vector).

A "circuit" as used herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions which will be described below in further detail may also be understood as a "circuit". It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit. The term "circuit arrangement" may refer to a single circuit, a collection of circuits, and/or an electronic device composed of one or more circuits.

As used herein, "memory" may be understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component comprising one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "base station" used in reference to an access point of a mobile communication network may be understood as a macro base station, micro base station, Node B, evolved NodeB (eNB), Home eNodeB, Remote Radio Head (RRH), relay point, etc. As used herein, a "cell" in the context of telecommunications may be understood as a sector served by a base station. Accordingly, a cell may be a set of geographically co-located antennas that correspond to a particular sectorization of a base station. A base station may thus serve one or more cells (or sectors), where each cell is characterized by a distinct communication channel. Furthermore, the term "cell" may be utilized to refer to any of a macrocell, microcell, femtocell, picocell, etc.

For purposes of this disclosure, radio communication technologies may be classified as one of a Short Range radio communication technology, Metropolitan Area System radio communication technology, or Cellular Wide Area radio communication technology. Short Range radio communication technologies include Bluetooth, WLAN (e.g. according to any IEEE 802.11 standard), and other similar radio communication technologies. Metropolitan Area System radio communication technologies include Worldwide Interoperability for Microwave Access (WiMax) (e.g. according to an IEEE 802.16 radio communication standard, e.g. WiMax fixed or WiMax mobile) and other similar radio communication technologies. Cellular Wide Area radio communication technologies include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies. It is understood that exemplary scenarios detailed herein are demonstrative in nature, and accordingly may be similarly applied to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, encompasses both an access section of a network (e.g. a radio access network (RAN) section) and a core section of a network (e.g. a core network section). The term "radio idle mode" or "radio idle state" used herein in reference to a mobile terminal refers to a radio control state in which the mobile terminal is not allocated at least one dedicated communication channel of a mobile communication network. The term "radio connected mode" or "radio connected state" used in reference to a mobile terminal refers to a radio control state in which the mobile terminal is allocated at least one dedicated uplink communication channel of a mobile communication network.

Unless explicitly specified, the term "transmit" encompasses both direct (point-to-point) and indirect transmission (via one or more intermediary points). Similarly, the term "receive" encompasses both direct and indirect reception. The term "communicate" encompasses one or both of transmitting and receiving, i.e. unidirectional or bidirectional communication in one or both of the incoming and outgoing directions.

As described herein, the term "mobility" may refer to any of movement of a user device relative to a base station, a velocity of user device movement relative to a base station, an acceleration of the user device relative to a base station, a rotation of the user device around one or more axes, or any combination thereof.

Antenna-based communication systems may utilize beamforming in order to create steered antenna beams with an antenna array. Beamforming systems may adjust the delay and/or gain of each of the signals transmitted by (or received with in the receive direction) the elements of an antenna array in order to create patterns of constructive and destructive inference at certain angular directions. Through precise selection of the delays and gains of each antenna element, a beamforming architecture may control the resulting interference pattern in order to realize a steerable "main lobe" that provides high beam gain in a particular direction. Many beamforming systems may allow for adaptive control of the beam pattern through dynamic adjustment of the delay and gain parameters for each antenna element, and accordingly may allow a beamformer to constantly adjust the steering direction of the beam such as in order to track movement of a transmitter or receiver of interest.

Beamforming architectures may conventionally employ one or both of digital and radio frequency (RF) processing in order to apply the desired delay and gain factors at each element of the array. Phased antenna arrays are a particularly favored RF beamforming technique for narrowband signals which relies on the approximate equivalence between phase shifts and time delays for narrowband signals. Accordingly, phased antenna arrays may place an RF phase shifter in the signal path of each antenna element and allow the individual phase shift values to be adjusted in order to steer the resulting antenna beam. Although many phased array designs achieve sufficient performance with phase-only control, variable gain amplifiers and other techniques such as tapering may additionally be implemented in order to also allow for gain adjustment.

Beamforming systems have been targeted as a potentially important component in high frequency next-generation communication networks such as millimeter wave (mm-Wave) and other so-called "5G" radio technologies. These radio technologies may operate at carrier frequencies of 30 GHz and above, and may need to rely on high beamforming gains in order to compensate for the high path loss associated with carrier frequencies in these ranges.

user device receive Analog beam forming is one major feature introduced by 5G NR mmWave band (FR2) communications. Analog beamforming may be achieved by antenna arrays within a user device (also named as antenna panels) as shown in FIG. 1A. In the system model of FIG. 1A, N is the number of antenna elements within one antenna array, as depicted by Antenna 1 102a, Antenna 2 102b, and up to the Nth Antenna 102n. The formula r(k,t), k=1, 2, . . . , N is the received analog signal on each antenna element within the antenna array at time t. A vector of phase configurations $\theta_p(k)$, k=1, 2, . . . , N from a corresponding phase shifter 106a, 106b, 106n and Low Noise Amplifier ("LNA") gain configurations $g_p(k)$, k=1, 2, . . . , N, $g_p(k)>0$ from LNAs 104a, 104b, and 104n for the antenna elements within the antenna array is called one analog code-word (a phase vector+a gain vector). For each code-word p, the analog beam-formed receive signal at user device receiver side is then represented as the following form:

$$s(t) = \sum_{k=1}^{N} r(k, t) \cdot g_p(k) \cdot e^{j\theta_p(k)} \quad (1)$$

The user device can pre-optimize a set of analog code-words (called an analog code-book), e.g. by lab calibrations and or lab testing, and store the pre-optimized code-book in its memory. Each code-word is associated with one user device receive-beam. Different code-words can be associated with different user device receive-beams pointing in different spatial directions, but can also be associated with receive-beams pointing in the same spatial direction but with different beam widths. During online operation, through 5G NR beam management procedures, the user device needs to identify the best received beam. According to one aspect of the disclosure, the beam may, but need not, correspond to a code-word, such as a code-word from its pre-stored code-book for DL reception. The amplified, phase-corrected signals received on antennas 102a through 102n may be combined in an analog combiner 108, said combination then being processed by an analog-to-digital converter 110.

The beam shape may be influenced by setting a beam gain, which functionally alters the transmission region of a beam and thus concentrates the transmission power or decibels within the beam. Gain G may be understood as the product of antenna efficiency E and directivity D, such that $G = E_{antenna} \times D$. The efficiency E is determined in relation to the input power $P_{in}$ of the antenna related to the output power $P_o$, such that $P_o = E_{antenna} \times P_{in}$. The directivity of the antenna refers to the degree of focused output within a three-dimensional space, based on spherical coordinates ($\theta$, $\varphi$), wherein $\theta$ is the altitude and $\varphi$ is the azimuth. The power distribution is shown in the radiation intensity $U(\theta, \varphi)$. The mean radiation intensity $$\overline{U} = \frac{P_o}{4\pi}.$$

The directivity is given by $$D(\theta, \varphi) = \frac{U(\theta, \varphi)}{\overline{U}}.$$

Gain is then shown by $$G(\theta, \varphi) = \frac{U(\theta, \varphi)}{\frac{P_{in}}{4\pi}}.$$

Figure 1B:
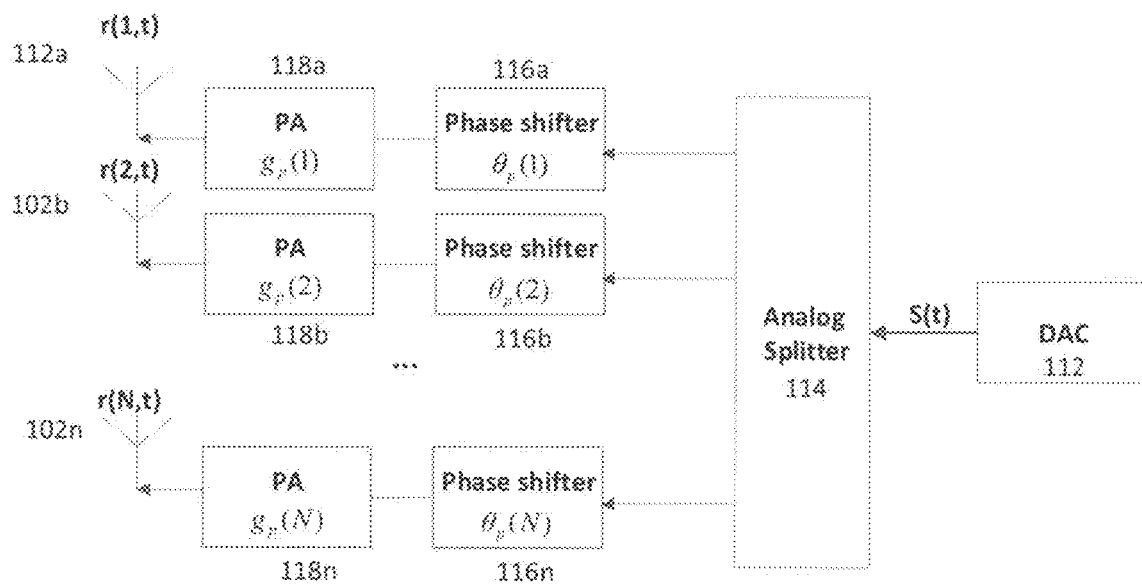
FIG. 1B shows an analog beamforming system for a transmit-beam.

FIG. 1B depicts analog beamforming for transmission. In the system model of FIG. 1B, a digital transmission is processed by the Digital-to-Analog converter 112, the results of which are transferred to the Analog Splitter 114, which, in the case of a transmission, splits the transmission signal across a plurality of antennas. The output of the Analog Splitter 114 is sent to a plurality of phase shifters 116a, 116b, and 116n, to shift a signal phase for beamforming, and the phase-shifted signals are sent to the corresponding power amplifiers 118a, 118b, and 118n for signal amplification and transfer to the corresponding antenna 112a, 112b, to 112n for transmission.

Figure 2:
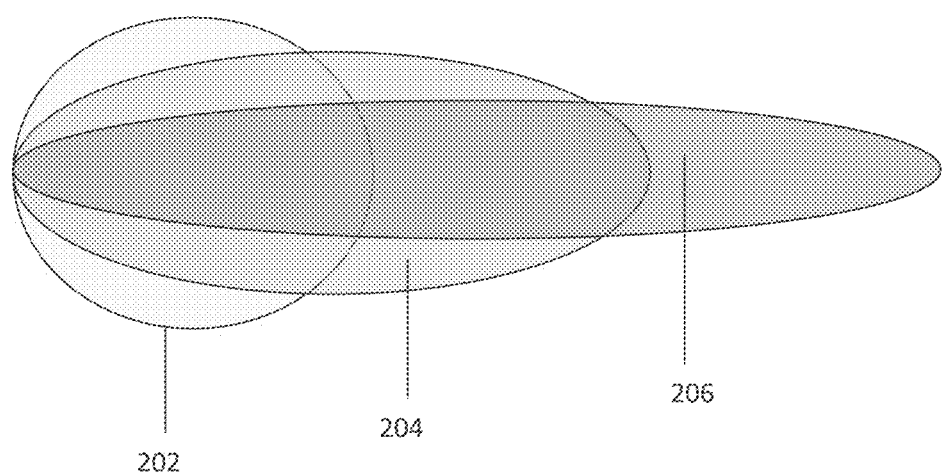
FIG. 2 shows a wireless transmission beam according to a variety of gain settings.

FIG. 2 depicts the influence of beam gain changes in a beam form. Signal 202 is depicted as having a first gain; signal 204 is depicted as having a second gain; and signal 206 is depicted as having a third gain, wherein the third gain is greater than the second gain, which is greater than the first gain. As is demonstrated, a larger gain corresponds to a narrow, more focused beam.

Using beamforming and gain change, a beam management protocol can be performed. A conventional beam management protocol includes a three-phase procedure referred to herein as P1, P2, and P3. In P1, and initial beam acquisition is performed, wherein a base station sweeps through an array of wide beams (low gain beams), which are received by a user device. The user device measures the received signal strength of the array of wide beams, and reports corresponding information to the base station, such that the best wide beam is selected. Also within the P1 step, the user device selects a best wide receive-beam to receive the wide transmit-beam from the base station. The best wide beam may be a result of the physical relationship between the base station and the user device, such as the altitude and azimuth. The best wide beam may further be influenced by physical objects between the base station and the user device, magnetic fields, interference, or otherwise. At the conclusion of the P1 step, a best wide transmit-beam and a best wide receive-beam are determined.

Once the best wide transmit-beam and the best wide receive-beam are determined, the P2 step is carried out, during which the base station sweeps through an array of narrow transmit-beams while the user device receives and measures the array of narrow transmit-beams with a single fixed wide receive-beam. The base station's narrow beams may correspond to a region of the best wide transmit-beam, such that the region of the best wide transmit-beam is subdivided into a plurality of subregions, each subregion corresponding to a fraction of the area of the wide transmit-beam, and corresponding to a width of a narrow transmit-beam. The base station determines a best transmit-beam based on a user device's report of the layer 1 reference signal received power for each candidate transmit-beam. This measurement resource can be based, for example, either on Synchronization Signal Block ("SSB") signals, which are periodically transmitted, or Channel State Information Reference Signals ("CSI-RSs"), which can be scheduled to be periodic, aperiodic, or semi-periodic.

Once a best narrow transmit-beam is selected, the base station and the user device proceed with step P3, during which the user device performs receive-beam sweeping. The base station fixes its best narrow transmit-beam, identified from step P2, and indicates the resource ID associated with the best narrow transmit-beam to the user device. The user device sweeps through an array of narrow receive-beams and finds the best receive-beam based on the user device's internal measurement metrics. These measurement metrics can be based on SSB signals or CSI-RSs. Following the conclusion of step P3, a best narrow transmit-beam and a best narrow receive-beam have been selected, and the wireless communication may proceed accordingly.

One method of downlink beam management is a multistep method to transition from initial beam acquisition to paired narrow beams between a base station and a user device, which will be referred to herein as the P1/P2/P3 method.

The P1 step of the P1/P2/P3 method includes an initial beam acquisition, wherein the user device finds a best wide (lower gain) transmit and receive-beam pair, which can be achieved, for example, using synchronization signal blocks (SSBs). This procedure is typically performed in idle mode. At the conclusion of this procedure, the user device and base station have typically arrived at a best wide beam pair link, wherein the base station has a best wide transmit-beam, and the user device has a best wide receive-beam.

Figure 3:
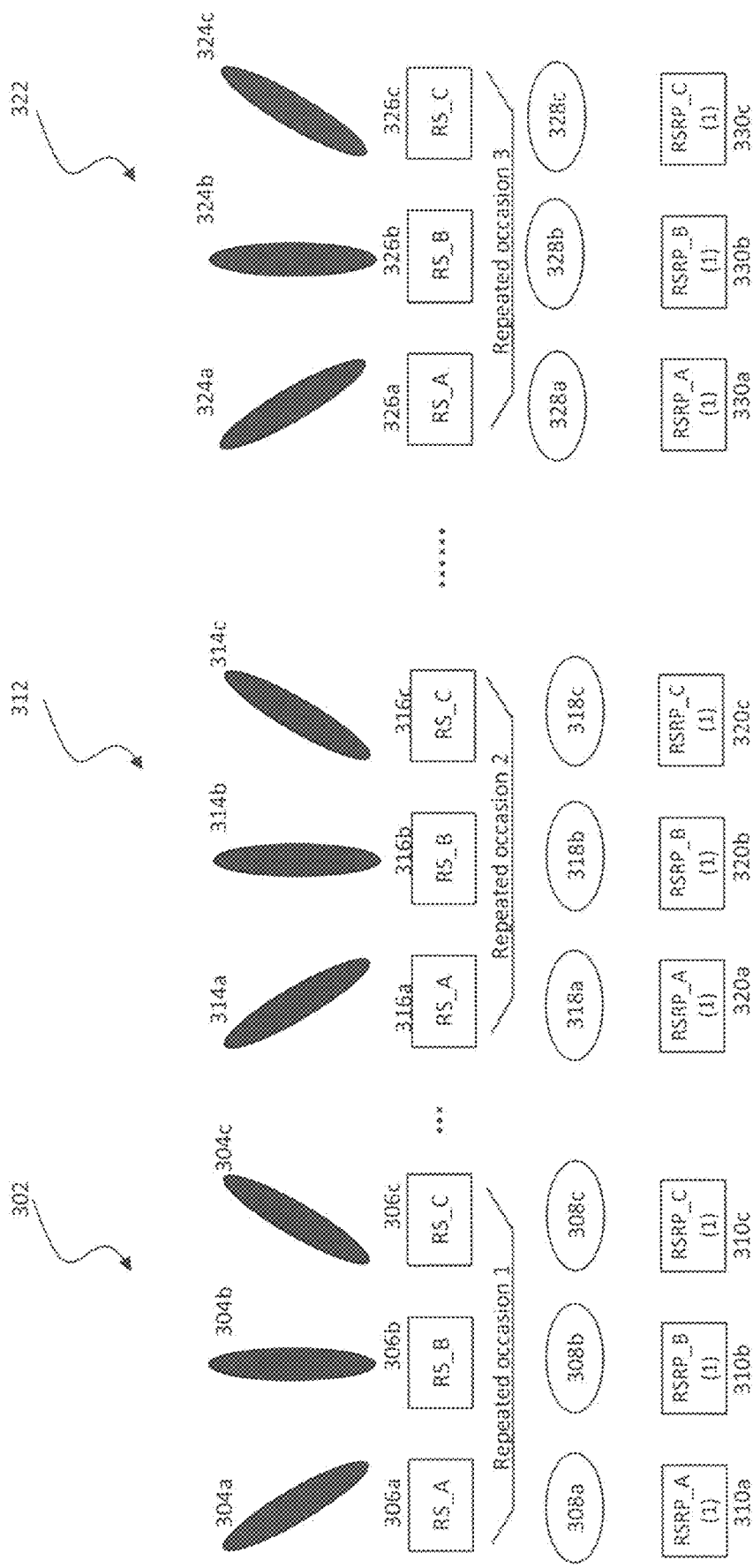
FIG. 3 shows a method of beam selection.

FIG. 3 depicts a P2 step of the P1/P2/P3 method. In this step, the base station performs transmit-beam sweep with narrow candidate transmit-beams while the user device uses a fixed wide (lower gain) receive-beam. The base station determines a best transmit-beam based on the user device's L1 RSRP measurement reports for each candidate transmit-beam. The measurement resource may be based on SSB signals, which are periodically transmitted, or Channel State Information Reference Signals ("CSI-RSs"), which can be scheduled to be periodic, aperiodic, or semi-periodic.

According to FIG. 3, and further with respect to P2, a base station performs transmit-beam sweeping to arrive at a best narrow transmit-beam. The beam measurement resources are beam measurement reference signals such as, but not limited to, SSB signals or periodic CSI-RSs. By using RRC signaling, each beam measurement resource is identified by a unique ID, such as, but not limited to, an SSB ID or CSI-RS Resource Indicator ("CSI"). The measurement resources are periodically repeated within the measurement reporting interval. FIG. 3 depicts three periodic beam measurement resources: RS A 306*a*, 316*a*, and 326*a*; RSB 306*b*, 316*b*, and 326*b*; and RS C 306*c*, 316*c*, and 326*c*. The number of the measurement resources depicted herein is selected for convenience purposes, and the number may be smaller or greater, without restriction. Each beam measurement resource is associated with a different base station transmit-beam. As depicted in FIG. 3, each measurement resource is repeated N times, resulting in N repeated occasions. The number of repeated occasions depicted in the figures herein is three, comprising a first repeated occasion, a second repeated occasion, and an Nth repeated occasion. The number three is depicted for convenience only, and the number of repeated occasions may be any number, without limitation. This is depicted at least by the ellipsis between the second repeated occasion and the Nth repeated occasion. The user device measures the measurement resources and reports to the base station a best L1-RSRP, as well as the associated resource ID which reflects the best transmission beam from the user device's point of view.

Turning to the details of FIG. 3, a first beam selection Occasion 302 depicts a base station employing an array of, in this case, three narrow (high gain) transmit-beams, indicated herein as 304*a*, 304*b*, and 304*c*. Each narrow transmit-beam may be received by the user device and measured accordingly, depicted in FIG. 3 as reception A 306*a*, which corresponds to transmit-beam 304*a*; reception B 306*b*, which corresponds to transmit-beam 304*b*; and reception C 306*c*, which corresponds to transmit-beam 304*c*. Each transmit-beam is received using a receive-beam beamforming setting. According to this beam selection protocol, the user device may use a single receive-beamforming setting for each narrow transmit-beam, and for each repeated Occasion of transmit-beams, as depicted herein. With respect to Occasion One, the user device maintains a uniform receive-beamforming setting for each transmit-beam, such that receive-beam 308*a* corresponds to transmit-beam 304*a*; receive-beam 308*b* corresponds to transmit-beam 304*b*; and receive-beam 308*c* corresponds to transmit-beam 304*c*.

The transmission of the array of transmit-beams includes a first Occasion of transmit-beams. The Occasion of transmit-beams may be repeated any number of times. A repeated Occasion of transmit-beams permits the user device to re-measure transmit-beam signals and to create an average measurement of transmit-beam signals for transmission to the base station. FIG. 3 depicts at least three occasions of transmit-beam transmissions, Occasion A, Occasion B, and up to Occasion N. Each Occasion includes a repeated array of transmit-beams and receive-beams. As depicted in FIG. 3, Occasion B includes transmit-beams 314*a*, 314*b*, and 314*c*, which are received in reception 316*a*, 316*b*, and 316*c*, respectively, using receive-beams 318*a*, 318*b*, and 318*c*, respectively. Occasion N includes transmit-beams 324*a*, 324*b*, and 324*c*, which are received in reception 326*a*, 326*b*, and 326*c*, respectively, using receive-beams 328*a*, 328*b*, and 328*c*, respectively. The user device measures a signal quality of the received transmit-beams, wherein a measurement is generally performed for each of the received transmit-beams, as depicted by 310*a*, 310*b*, and 310*c*, with respect to Occasion A, 320*a*, 320*b*, and 320*c*, with respect to Occasion B, and 330*a*, 330*b*, and 330*c*, with respect to Occasion N. The user device prepares a report of the measured signal qualities for transmission to the base station. The report may include one or more measurements for each beam of each repeated Occasion, or the report may include an average of measurements corresponding to a single transmit-beam, transmitted over a plurality of Occasions. By transmitting an average measurement, rather than a plurality of individual measurements, short-lived phenomena, which may impair or disturb reception can be accounted for. In preparing the report, the user device may engage in a postprocessing procedure, whereby the repeated measurement results for each measurement resource are combined to obtain a more accurate L1-RSRP results. According to one aspect of the disclosure, the repeated measurement results may be gained from IIR filters or FIR filters. The user device may select the strongest estimated L1-RSRP from the measurement resources and report this result associated with its resource ID to the base station through uplink channels.

Figure 4:
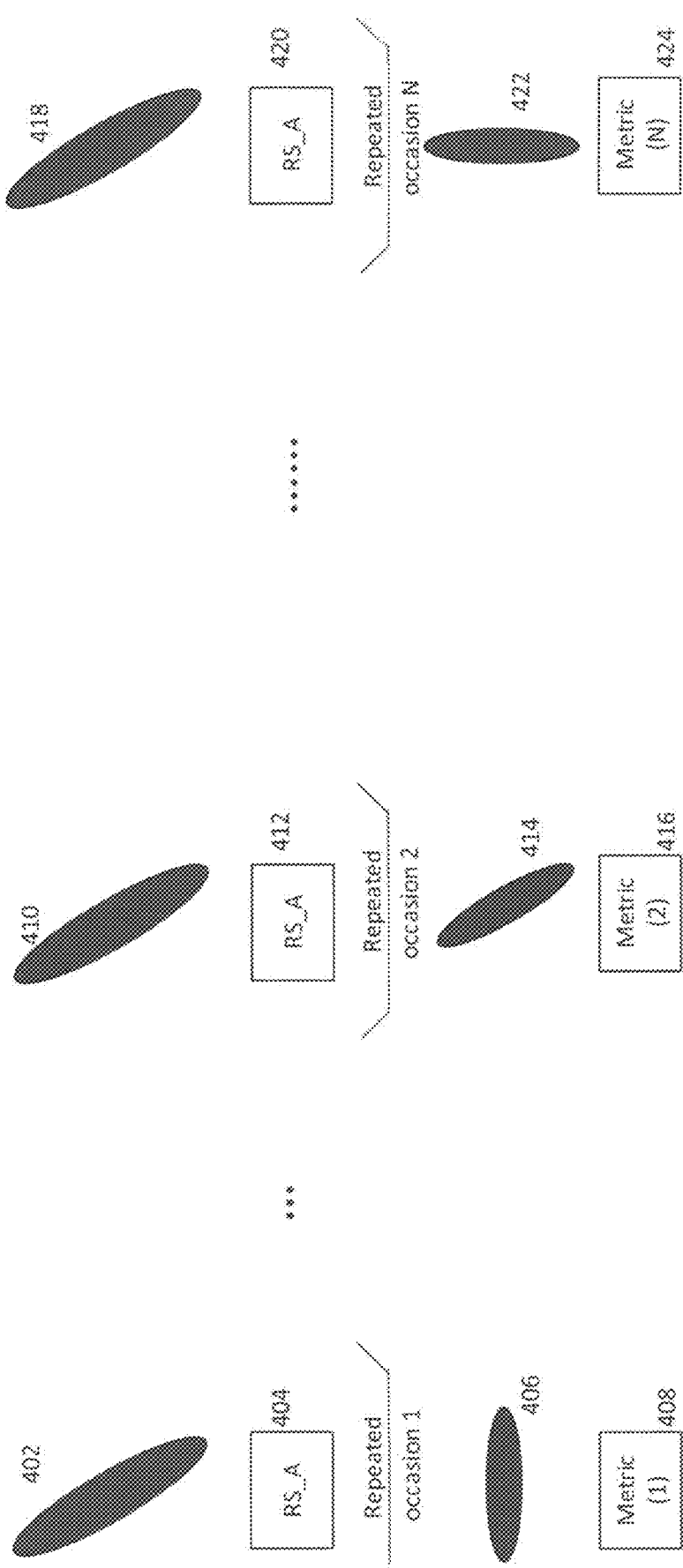
FIG. 4 shows a P3 step of beam selection.

FIG. 4 depicts a P3 step of the P1/P2/P3 method, which is performed subsequent to the P2 beam selection procedure depicted in FIG. 3. Based on the user device measurement report in P2, the base station fixes the measurement resource associated with the best transmit-beam. The user device then initiates a receive-beam sweep in procedure on the selected resource. In the P3 procedure, the user device measurement is not restricted to L1-RSRP, but can be based on additional and/or alternative metrics, because the user device need not report the measurement results to the base station for this phase.

Turning to FIG. 4, after the user device transmits its report of measured signal qualities to the base station, the base station may determine a best narrow (high gain) transmit-beam. Thereafter, the base station transmits a plurality of iterations of the selected narrow transmit-beam as depicted by 402, 410, and 418. During each of these iterations, the user device receives the narrow transmit-beam as shown by 404, 412, and 420, respectively. During these iterations, the user device may be configured to implement a plurality of narrow (high gain) receive-beams, as depicted in 406, 414, and 422. The narrow receive-beams may be configured in different directions. The narrow receive-beams may be selected such that at least one narrow receive-beam at a first direction corresponds with a first narrow transmit-beam, and at least one narrow receive-beam at a second direction corresponds with a second narrow transmit-beam, as depicted in 406 and 414, respectively. Because the narrow transmit-beams at this stage are expected to be substantially identical, the user device may measure a signal quality of the repeated transmit-beams using a plurality of different narrow receive-beams. Following the cycle of received transmit-beams, the user device may determine a best receive-beam by measuring a signal quality of the received beams as depicted in metrics 1, 2 and N, 408, 416, and 424 respectively. Upon determining a best narrow receive-beam, the user device may employ the best narrow receive-beam to receive future transmissions from the base station.

The P2 base station transmit-beam sweeping procedures and the P3 user device receive-beam sweeping procedures are time-multiplexed. That is, determination of an optimal beam pair requires iterative execution of P2 and P3, which may be time-consuming. In high mobility scenarios, a standard formulation of the P1/P2/P3, method may be insufficiently rapid to track user device receive-beam changes.

Figure 5:
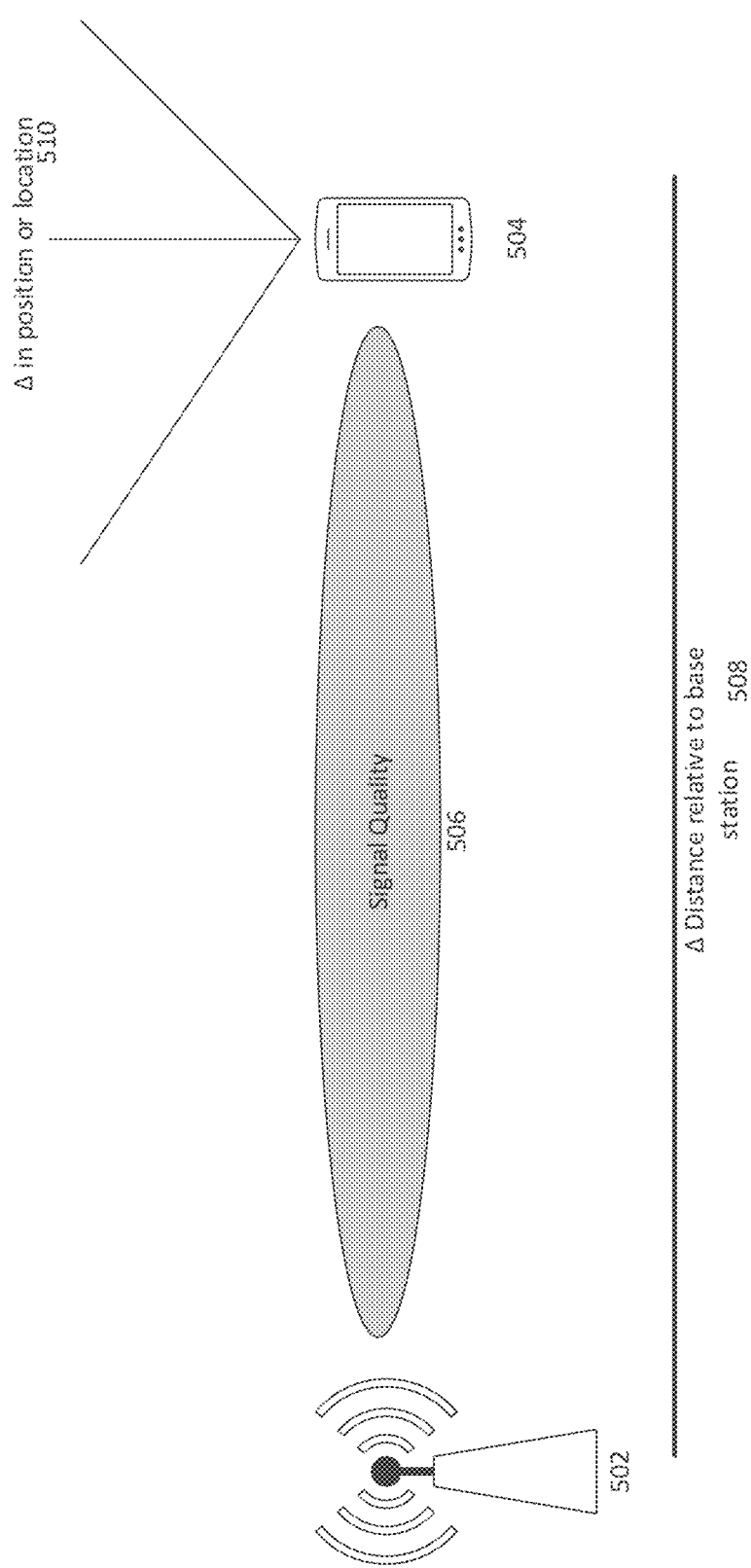
FIG. 5 shows a signal factor and mobility as an element of beam selection.

FIG. 5 depicts a signal measurement and mobility measurement, according to one aspect of the disclosure. Although a base station 502 may communicate with a plurality of user devices concurrently, the signal measurement and mobility measurement is depicted herein, for simplicity, between a single base station in a single user device 504. In this case, the base station 502 transmits a wireless communication via a beam according to a beamforming setting 506 to the user device 504. Upon receiving the wireless transmission, the user device 504 measures a signal quality of the wireless transmission. According to one aspect of the disclosure, the signal quality may be a signal to noise ratio, although any other measurement may be used to discern a quality of the received wireless transmission by the user device. In addition, the user device 504 may measure a mobility of the user device 504. The mobility may be, for example, a change in distance relative to the base station 508, or a change in absolute position or location 510, such as measured using a global positioning system. The user device may be configured to compare the measured signal quality and measured mobility to one or more predetermined thresholds, such as to determine a high or low signal quality, and/or to determine a high or low mobility. According to another aspect of the disclosure, a plurality of thresholds may be available for at least one of signal quality or mobility, such that the wireless device may be configured to categorize at least one of signal quality and mobility into three or more levels.

The process of carrying out P1, P2, and P3 requires a sufficient duration such that a user device that is in motion may complete the P1 stage, and thereby arrive at an agreed-upon wide transmit-beam and wide receive-beam, but sufficiently change position or orientation before completing the P2 stage or P3 stage such that the agreed-upon wide transmit-beam and wide receive-beam combination is no longer ideal (and potentially even no longer acceptable) for the new position or orientation. Because the P2 and P3 steps only permit an iterative refinement of the wide transmit-beam and wide receive-beam that were selected in the P1 stage, there is no mechanism in the P2 or P3 phases to select a different wide transmit or wide receive-beam. Rather than declaring a beam selection failure and repeating the entire beam selection process, including repeating the P1 stage, it may be desirable to select an alternative wide receive-beam to accommodate the already selected wide transmit-beam and the new position or orientation.

It is known for the network to periodically transmit synchronization signal blocks (SSB), which may include one or more synchronization signals such as, but not limited to, primary synchronization signals, secondary synchronization signals, physical broadcast channel, or otherwise. Typically, the SSB is repeatedly transmitted at a predetermined duration and frequency, which may be dependent on subcarrier spacing, frequency range, or otherwise. With some signals, such as with SSB, the transmission may be regular and predefined, thereby allowing user device to predict a timing of the SSB transmission. The user device may be able to predict specific orthogonal frequency-division multiplexing (OFDM) symbols in which an SSB transmission will occur. This prediction may be possible significantly in advance of the SSB transmission.

It is also known to perform cell measurement using a measurement gap. A measurement gap is generally performed on a user device to facilitate monitoring cells on frequencies that are different from that of the serving cell. The measurement gap is typically a predetermined period in which no transmission or reception occurs within the serving cell. Because there is no transmission or reception expected, the user device may switch to the frequency of a target cell, perform signal measurement, and return to the serving cell. The measurement gap may be established by agreement between the user device and serving cell network. The measurement gap may be defined by any criteria including, but not limited to, starting position of the gap, gap length, frequency of gaps, etc.

Because the SSB transmission and the measurement gap occur at predetermined intervals, it is possible to predict when each will occur. Although these intervals may be different, and therefore the SSB transmission and measurement gap may not be expected to always occur concurrently, the nature of their consistent repetition results in periodic overlap of the SSB transmission and the measurement gap. That is, the SSB transmission will occasionally occur at least partially during the measurement gap. Because both the SSB transmission and the measurement gap occur at regular intervals, the user device may not only predict the SSB transmission and measurement gap, but the user device may also predict periods when the SSB transmission and measurement gap overlap or happen concurrently.

Figure 6:
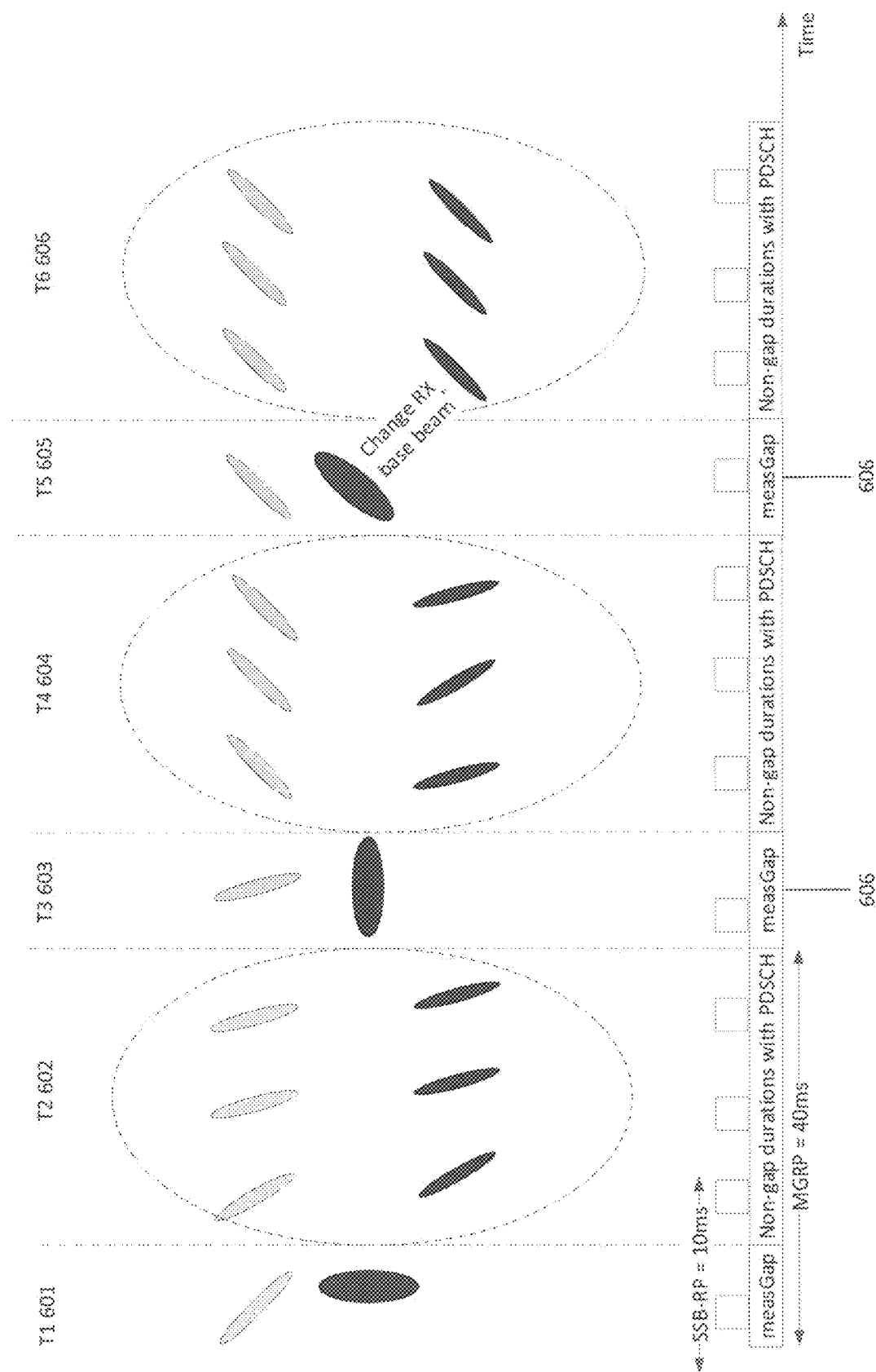
FIG. 6 shows a P2 method of beam selection according to a first aspect of the Disclosure.

FIG. 6 depicts utilizing a measurement gap to perform reception beam measurement using an SSB transmission. In this figure, six time periods are depicted: T1 601, T2 602, T3 603, T4 604, T5 605, and T6 606. The SSB is indicated as being transmitted every 10 ms. The measurement gap is depicted as occurring every 40 ms. As such, and as depicted herein, every fourth SSB occurs within a measurement gap. Periods T2 206, T4 604, and T6 606 may, for example, correspond to procedure P2, as described above; however, the methods and procedures described herein may also be applied during the P3 procedure. Each of these periods corresponds to one or more iterative attempts to refine a narrow transmit-beam, a narrow receive-beam, or both. Each of these periods is set off from the next by a measurement gap. Periods T1 601, T3 603, and T5 605 corresponded to measurement gaps. During each of these measurement gaps, an SSB burst is transmitted. Although the user device would normally utilize the measurement gaps to change frequencies and measure neighboring cells, the user device may be configured to utilize some or all of one or more measurement gaps to try an alternative wide receive-beam.

Otherwise stated, the user device will normally select a wide receive-beam in step P1, and the user device will typically maintain this wide receive-beam during the P2, and will iteratively attempt to refine the selected wide receive-beam by testing in the P3 step various narrow receive-beams that correspond to a narrowed setting of the selected wide receive-beam. However, because of various factors, including, but not limited to, user device movement or change in orientation, the wide receive-beam selected in stage P1 may no longer be desirable. As such, the user device may benefit by utilizing one or more measurement gaps to select alternative wide beam settings, which, if desirable, may be used to improve wireless communication with the cell, and which may serve as a basis to iteratively select a corresponding narrow receive-beam.

In this case, the user device in FIG. 6 has already selected a suitable wide receive-beam; however, the user device is in motion, and a change in orientation may render the selected wide receive-beam undesirable. The user device utilizes the measurement gaps at T1 601, T3 603 and T5 605 to test alternative wide receive-beams. It can be seen that the first candidate wide receive-beam at T1 601 does not correspond with the narrow transmit-beam, which suggests that this configuration will not be desirable. This is no matter, as the narrow receive-beams and narrow transmit-beams in T2 602 are relatively aligned, and the communication is likely to be acceptable. Nevertheless, the user device attempts an alternative wide beam at T3 603, but this wide receive-beam does not correspond with the narrow transmit-beam, thus yielding an unsatisfactory connection. In T4 604, the device orientation has changed, and its narrow receive-beams no longer correspond with the narrow transmit-beams, thereby yielding an unsatisfactory connection. In T5 605, the user device selects an alternative candidate wide receive-beam for testing during the measurement gap, and the candidate wide receive-beam matches sufficiently well with the narrow transmit-beam. In T6 606, the user device may employ the selected wide receive-beam from T5 605, or as depicted in FIG. 6, the user device may employ one or more narrow receive-beams that correspond to the wide receive-beam from T5 605.

Figure 7:
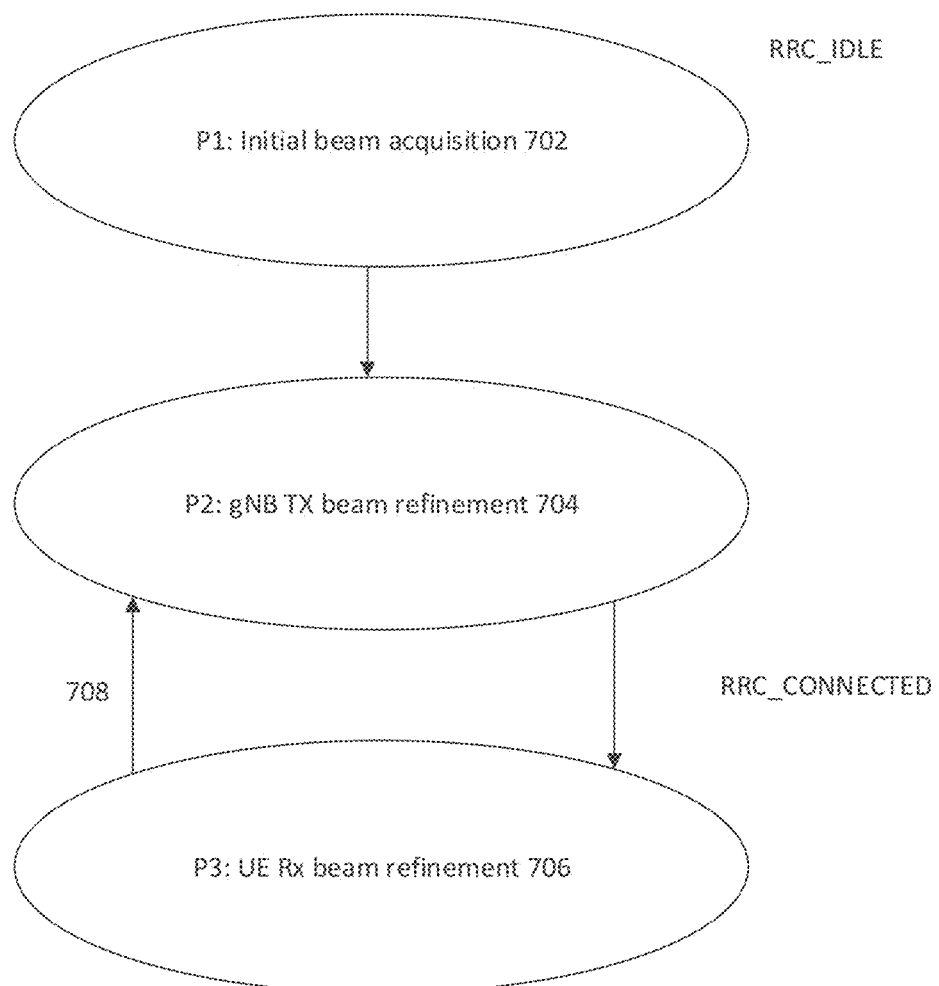
FIG. 7 shows a P2 method of beam selection according to a second aspect of the Disclosure.

FIG. 7 shows a procedure for selecting a receive-beam according to an aspect of the disclosure. An initial beam acquisition 702 is carried out in the P1 stage. The cell performs a transmission beam refinement procedure 704 during P2. The user device performs a receive-beam refinement procedure 706 during P3. Although the normal order is to proceed from P1 to P2 to P3, the additional arrow 708 is added hereto, to indicate that the receive-beam and transit beam refinement may occur in a revolving fashion following the P1 step, due to a selection of a new wide receive-beam as tested during the measurement gap.

Figure 8:
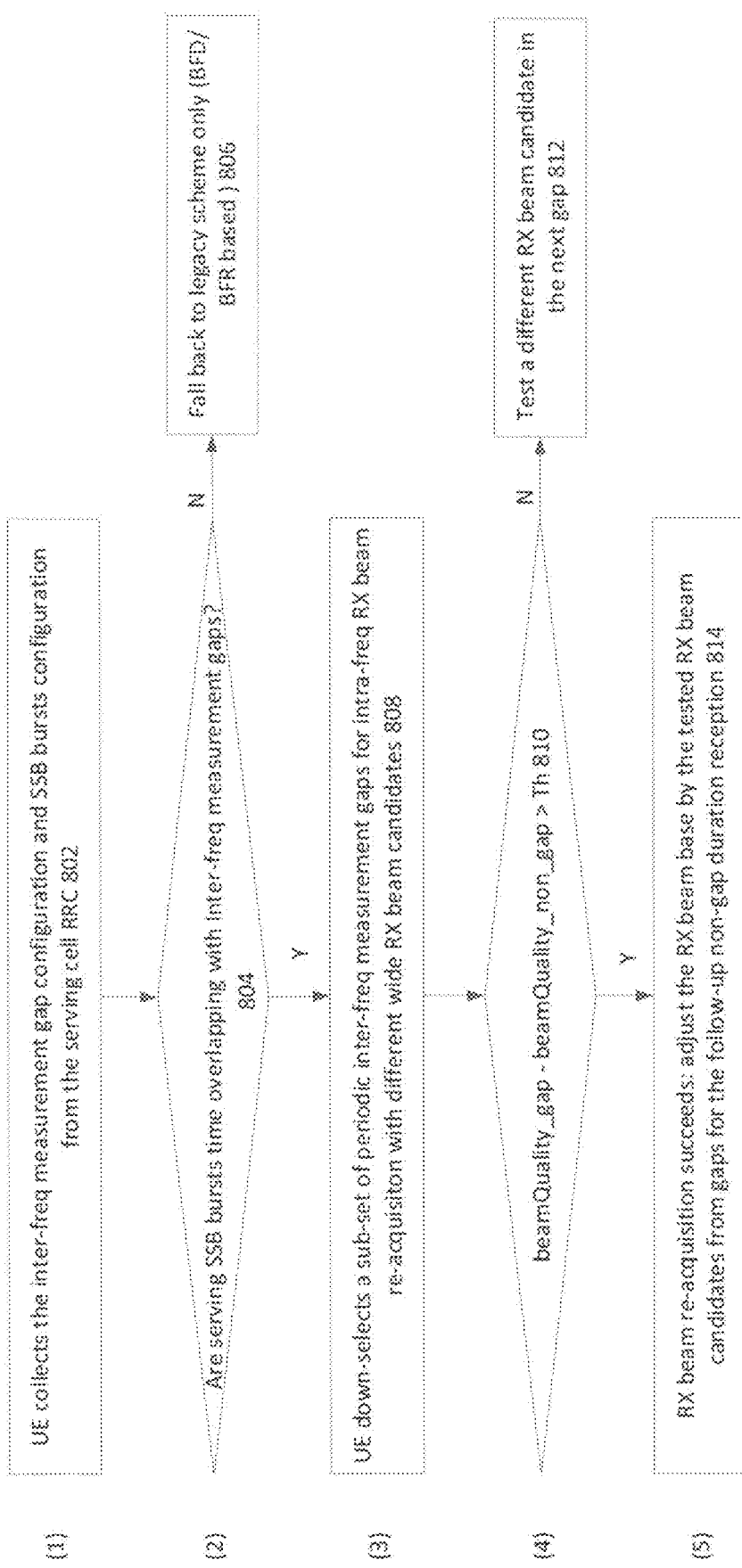
FIG. 8 shows a P2 method of beam selection according to a third aspect of the Disclosure.

FIG. 8 shows a procedure for receive-beam testing and management, according to an aspect of the disclosure. In this case, the user device collects an inter-frequency measurement gap configuration, as well as a timing for synchronization signal bursts from a serving cell 802. The user device then determines whether the synchronization signal bursts overlap with the inter-frequency measurement gaps, and if so, identifies the periods when the overlap occurs 804. If no overlap occurs, the user device may revert to a legacy scheme for beam selection 806. Assuming that overlap is possible, the user device may select a subset of periodic inter-frequency measurement gaps for intra-frequency receive-beam reacquisition with different wide receive-beam candidates 808. A comparison of the testing results for the different wide receive-beam candidates is then performed. According to one aspect, the testing may be performed by subtracting a signal quality of the receive-beam used in the beamforming protocol from a signal quality of the receive-beam tested within the measurement gap, and by comparing the result to a predetermined threshold 810. If the result is greater than a predetermined threshold, the receive-beam reacquisition testing is successful, and the receive-beam may be adjusted to be the tested receive-beam from the gap measurement 814. If the result is less than the predetermined threshold, a different receive-beam candidate may be tested in the next available measurement gap corresponding to a synchronization signal 812.

Figure 9:
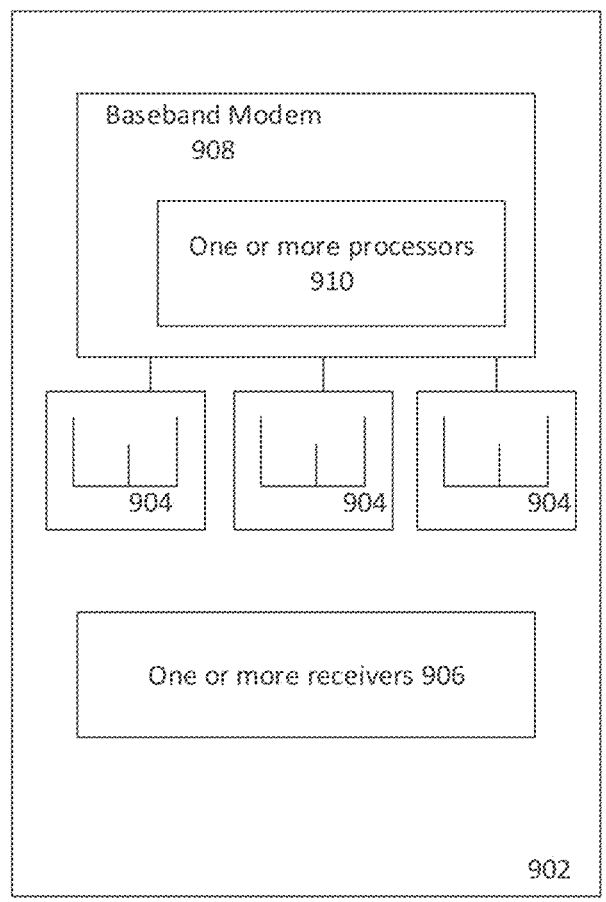
FIG. 9 shows a wireless communication device.

FIG. 9 depicts a wireless communication device 902 according to one aspect of the disclosure, the wireless communication device 902 comprising a plurality of antennas 904, configured to receive a wireless signal; one or more receivers 906, configured to detect position data indicating a position of the wireless communication device and to process the wireless signal for one or more processors 910; the one or more processors 910, configured to determine a signal quality of the wireless signal; determine a position change information about a position of the wireless communication device based on the detected position data; and select a beam selection protocol from a plurality of beam selection protocols based on at least the signal quality and the position change information. According to one aspect of the disclosure, the wireless communication device 902 may further include a baseband modem 908, configured to modulate and demodulate a signal for wireless communication. According to another aspect of the disclosure, the one or more processors 910 may be baseband modem 908 processors.

Figure 10:
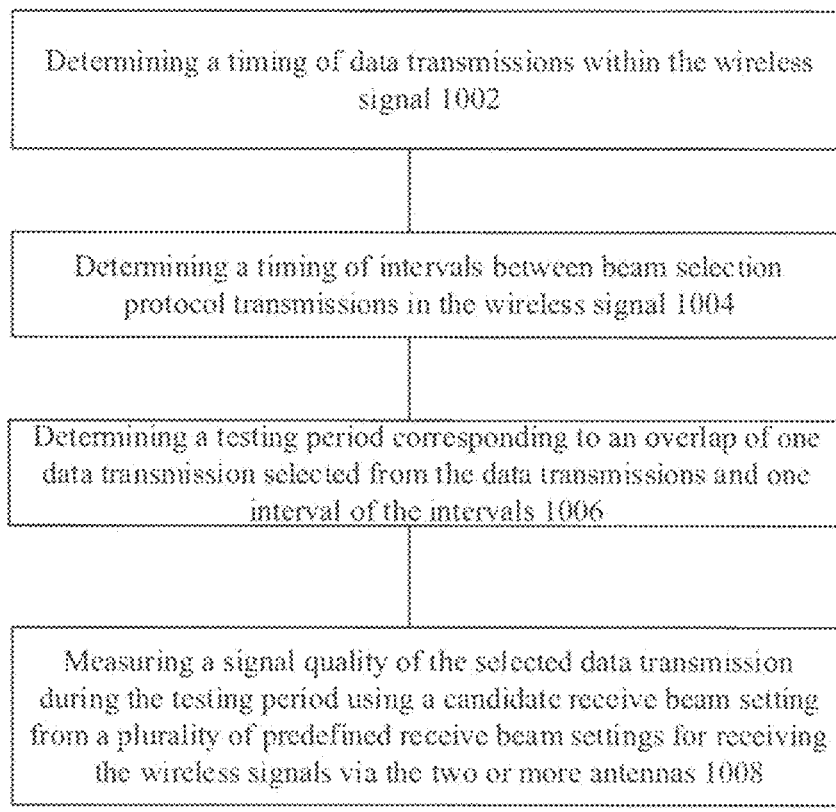
FIG. 10 shows a method for beam selection.

In FIG. 10, a method of beam selection is disclosed, comprising determining a timing of data transmissions within the wireless signal 1002; determining a timing of intervals between beam selection protocol transmissions in the wireless signal 1004; determining a testing period corresponding to an overlap of one data transmission selected from the data transmissions and one interval of the intervals 1006; and measuring a signal quality of the selected data transmission during the testing period using a candidate receive-beam setting from a plurality of predefined receive-beam settings for receiving the wireless signals via the two or more antennas 1008.

Figure 11:
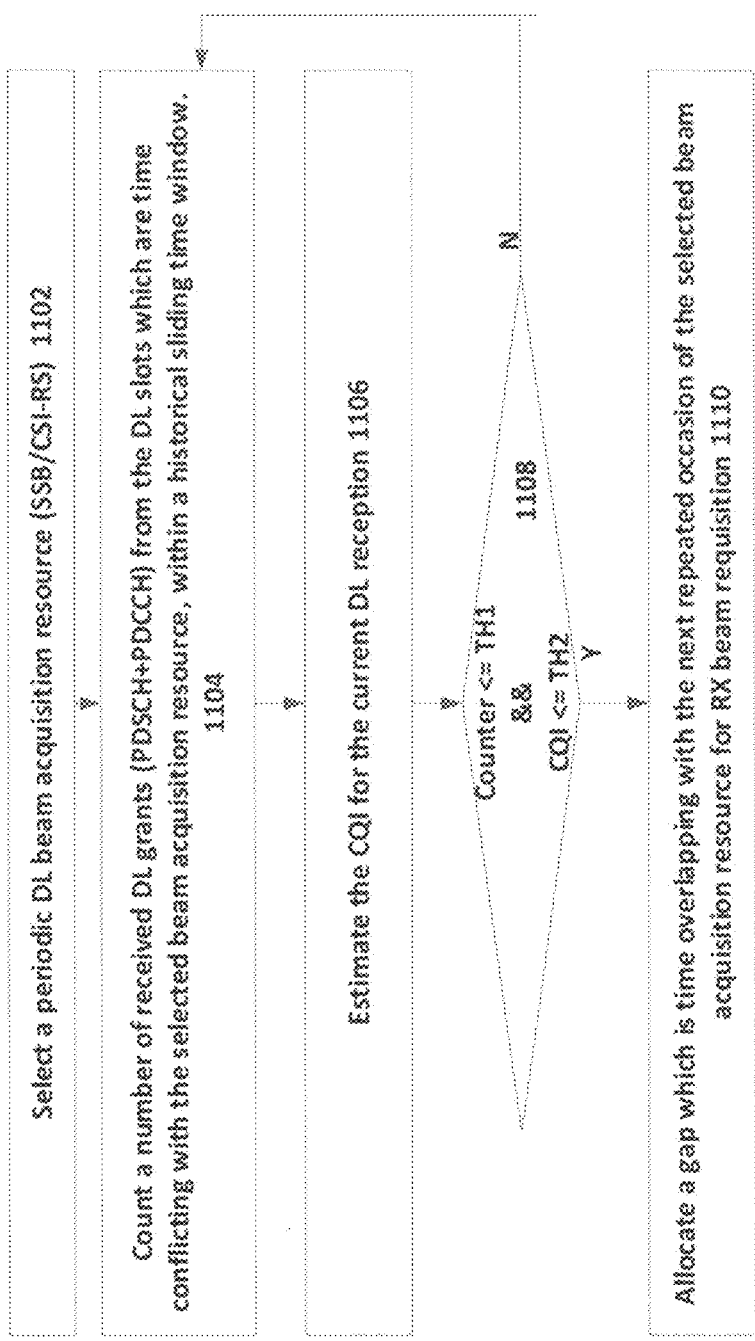
FIG. 11 shows a method of beam selection according to an additional aspect of the disclosure.

FIG. 11 shows a method of managing beam selection according to another aspect of the disclosure. Instead of making use of allocated inter-frequency measurement gaps, the user device may also autonomously identify a downlink time gap in RRC_CONNECTED mode based on a downlink grant prediction. This can be achieved by counting a number of received downlink grants from the downlink slots that are time conflicting with the user device selected periodic downlink beam acquisition resource within a historical sliding window. The sliding window can be scaled with the time periodicity of the user device selected downlink beam acquisition resource. The gap creation can be further determined by Channel Quality Indicator (CQI) estimates. That is, when CQI drops, it has two implications. First, poor CQI implies that the downlink quality is dropping, which can be a justification for downlink receive-beam reacquisition. Second, due to a low value in a received CQI report from the user device, the probability of scheduling massive downlink grants from the base station side is reduced, and therefore a probability that a downlink slot that is time conflicting with the selected downlink beam acquisition resource that contains a grant is decreased. When an upcoming downlink slot that is time conflicting with the user device selected downlink beam acquisition resource is predicted to be grant free, such a slot is identified as a gap and can be allocated for receive-beam reacquisition.

According to this procedure, a periodic downlink beam acquisition resource is selected 1102. This may include, for example, SS or CSI-RS, without limitation. A number of received downlink grants are calculated based on a number of downlink slots that are time conflicting with a selected beam acquisition resource within a historical sliding time window 1104. The CQI for the current downlink reception is estimated 1106. If a count of the corresponding downlink grants, as described in 1104 above, is less than or equal to a first threshold, and the CQI is less than or equal to a second threshold 1108, then a gap that is time overlapping with the next repeated occasion of the selected beam acquisition resource for the receive-beam reacquisition is allocated 1110.

The first threshold corresponding to the grant count may be depending on an adjustable time window for which the grants are counted. That is, the larger the window, the greater number of grants will be captured by the window, and the larger the first threshold will be likely to be. The adjustable time window may be any length whatsoever. According to one aspect of the disclosure, the adjustable time window may be 100 ms; according to another aspect of the disclosure, the adjustable time window may be 200 ms. The first threshold may be any desired number of grants, without limitation. According to one aspect of the disclosure, if the adjustable window is 100 ms, then first threshold may be one grant. If the adjustable window is 200 ms, the first threshold may be 2 grants.

According to another aspect of the disclosure, the second threshold may be any CQI value from 0 to 15. In some configurations, it may be desirable to set the second threshold as 2.

Base stations employ transmit-beams to send information to mobile devices. Base stations may be capable of one or more beamforming operations to control a transmit-beam to be primarily directed in a general direction, which may be useful in improving communication with a mobile device. Moreover, base stations may also be capable of altering a gain of the transmit-beam, thereby determining a width or narrowness of the transmit-beam.

Given the broad ability to direct and shape the base station's transmit-beams, it is useful to employ a beam selection protocol, which aids the base station and mobile device in selecting an suitable beam configuration. In general, a plurality of iterative beam sweeping techniques are used for this purpose. Often, the base station first employs a low gain transmission beam, and the low gain beam is directed in a series of headings to cause the beam to sweep across a beam selection region. A mobile device measures the received transmit-beams and reports to the base station a preferred beam, based, for example, on a best received signal strength or signal to noise ratio. Upon receiving this preferred beam, the base station will increase the beam gain to create a narrower transmit-beam, and the base station will perform an additional sweep using the higher-gain beam. Often the base station will send the higher-gain beam generally within a region corresponding to the lower-gain beam. That is, the base station will send the higher-gain beam with a sector that corresponds to the coverage of the preferred low-gain beam. The mobile device measures the received higher-gain transmit-beams and reports to the base station a preferred beam, such as based on the best receive signal strength or signal to noise ratio. By using an iterative, multi-step process, a suitable transmit-beam can often be selected.

In addition to beamforming of transmit-beams, such as by a base station, a user device may be capable of receive-beamforming. Unlike transmit-beamforming, which alters a projection of a wireless signal, receive-beamforming involves combining received information from various sensors such that a particular pattern is preferentially observed. With respect to a user device, the user device may be equipped with multiple antennas, and the receive signal from a plurality of antennas may be amplified by different weights or weighting patterns. By using this method, a functional main lobe within the receive area can be formed. Various receive-beamforming techniques are known in the art, and the procedures described herein may be performed with any known receive-beamforming technique.

As downlink or beam management becomes more commonplace, it will be necessary to create strategies to manage beam selection. For example, downlink beam management has been introduced into 5G New Radio millimeter wave communications and will require efficient strategies for managing beam selection. From a downlink perspective, the aim is to find a best beam pair link between the base station transmit antennas and the user device receive antennas.

In fast mobility scenarios, e.g. quickly rotating a user device, the time multiplexed gNB transmit-beam refinement (P2) and user device receive-beam refinement (P3) in RRC_CONNECTED state may not complete fast enough to keep the best TX/receive pair on track before the receive-beam and the transmit-beam become mismatched. One reason is that the reference signals (SSB or CSI-RS) used for TX/receive-beam refinement in RRC_CONNECTED state can be Frequency Domain Multiplexed (FDMed) with the Physical Downlink Shared Channel (PDSCH) channel. This restricts the search steps of beam refinement so as to avoid interrupting the DL PDSCH demodulation. As a result, when the gNB transmit-beam angle of arrival (AOA) is significantly changed due to user device rotation, the user device receive-beam may become impaired.

One strategy to address this scenario is for the user device to opportunistically identify any whole or partial time-overlapping between a serving cell SSB burst pattern and the configured inter-frequency measurement gap pattern. When an overlap is detected, the user device adaptively selects a subset of the configured inter-frequency measurement gaps and takes advantage of them for intra-frequency serving cell receive-beam reacquisition.

The reacquisition is achieved by measuring wide receive-beam candidate beams during the serving cell SSB bursts that, whether in whole or in part, overlap with the selected measurement gaps. This introduces an additional receive-beam reacquisition loop into the gap durations, which is the applied in parallel with DL PDSCH demodulation from the non-gap durations. This procedure allows the user device to test different wide receive-beam candidates without interrupting the serving cell DL data PDSCH demodulation. As a result, the serving cell receive-beam tracking robustness can be improved, especially in high mobility scenarios, such as during user device rotation.

It is additionally proposed to adaptively determine a ratio between the number of selected intra-frequency serving cell receive-beam re-acquisition gaps, as described herein, and the number of total allocated inter-frequency measurement gaps, so that the tradeoff between the serving cell receive-beam tracking robustness and the inter-frequency handover performance can be optimized. The ratio can be determined by run-time metrics, such as the serving cell DL reception quality in non-gap durations, and the strengths and the number of already measured inter-frequency neighboring cells in the neighboring cell database.

The exact user device usage of an allocated inter-frequency measurement gap may be transparent to the network. The methods and procedures described herein may be 3GPP standard compliant, provided that the user device can fulfill an inter-frequency neighboring cell reporting delay requirement. Such a requirement may be, for example, every 200 ms, which may be readily achieved with the methods and procedures described herein. Moreover, the methods and procedures described herein may also be compliant with legacy methods; however, a user device using the methods and procedures described herein may quickly adapt the receive-beam back to track when the gNB transmit-beam AOA is suddenly changed in high mobility scenarios, such as during user device rotation.

According to one aspect of the disclosure, user device may first detect a time overlap between a serving cell SSB burst pattern and the serving cell configured inter-frequency measurement gap pattern. The user device may then adaptively select a subset of the allocated inter-frequency measurement gaps for intra-frequency serving cell receive-beam reacquisition. The reacquisition is performed by measuring significantly different wide receive-beam candidates applied on the serving cell SSB bursts, which are at least partially time overlapped with the selected measurement gaps.

Because the time overlapping part of a SSB burst with an inter-frequency measurement gap can hold multiple SSBs, the SSB-based receive-beam re-acquisition within a gap may be implemented such that only one distinguishing receive-beam candidate is tested within one measurement gap, where the beam quality metric is the averaged metric over the multiple SSB measurements within the time-overlapped SSB burst. Alternatively, multiple distinguishing receive-beam candidates (each applied on a single SSB) may be tested within one measurement gap, and the best distinguishing receive-beam candidate with the best measurement quality is selected.

As shown above with respect to FIG. 6, the periodic inter-frequency measurement gaps are allocated between DL PDSCH traffic from the network to the user device. In the example depicted in FIG. 6, the Measurement Gap Repetition Period (MGRP) is 40 ms; however, the period may be any other period, without limitation. According to one aspect of the disclosure, the period may be any 3GPP allowed value, such as, for example, 80 ms.

The periodic serving cell SSB bursts may also be allocated within the same carrier as DL PDSCH traffic. The allocated SSBs may be Frequency Domain Multiplexed (FDMed) with PDSCH in non-gap durations, which may restrict the granularities of receive-beam refinement in non-gap durations, such that only small receive-beam change steps are possible in non-gap durations. In this example, the Repetition Period (RP) of serving cell SSB bursts is 10 ms but can also be other values, such as, for example, 3GPP defined values. One such acceptable 3GPP value may be 20 ms.

As demonstrated in FIG. 6, the SSB burst pattern may be time-overlapping with the allocated inter-frequency measurement gaps. This can be detected by user device by comparing the slot offset of the allocated serving SSB bursts with the slot offset of the configured inter-frequency measurement gaps. Since the Repetition Period (RP) of an SSB burst is generally divisible by the Measurement Gap Repetition Period, if at least one serving cell SSB burst even partially overlaps within one measurement gap, then future serving cell SSB bursts will also at least partially overlap within each measurement gap periodically. In the example of FIG. 6, T1, T3 and T5 are gNB allocated inter-frequency measurement gaps which are selected and alternatively utilized by the user device for intra-frequency serving cell receive-beam reacquisition. The reacquisition is based on the measurement of serving cell SSB bursts which time-overlap within the gaps. T2, T4 and T6 are non-gap durations in which the user device demodulates DL PDSCH while applying a receive-beam refinement. The refinement is based on the measurement of serving cell SSB burst measurements, which are frequency division multiplexed with PDSCH in non-gap durations, such as by testing narrow beams in small increments. The receive-beam candidates tested in T1, T3 and T5 can be significantly distinguished from the fine-tuned receive-beams in T2, T4 and T6.

Further with respect to FIG. 6, and before T4, the user device receive-beam is on track with respect to the gNB transmit AOA. Therefore, the SSB burst measurement for the receive-beam refinement within T2 shows good signal quality, such as a high Reference Signal Received Quality (RSRP) and/or high Signal to Noise Ratio (SINR).

In contrast, the SSB burst measurements for receive-beam reacquisition within T1 and T3 show poor quality, as may be demonstrated by low RSRP and/or low SINR). Moreover, due to a high user device mobility, such as a sudden rotation of the user device, the gNB transmit AOA may be changed in T4. The receive-beam refinement within T4 is not able to track given the significant user device rotation and corresponding transmit-beam AOA change. This results in degraded PDSCH reception quality and poor SSB burst measurement quality within T4. In this situation, the radio link may not be declared as failing yet, since failure may be depending, for example on PDCCH BLER measurement, which may still be above the threshold for failure. Since no failure is declared, the beam selection procedure cannot be quickly re-triggered and re-started at P1.

By using the methods and procedures described herein, the user device may be able to recover from the significant transmit-beam AOA change in T5 by testing a matched wide receive-beam candidate by the user device in the measurement gap T5. The user device may then accordingly readjust the base receive-beam for the follow-up PDSCH reception in non-gap durations. Having performed the adjustment, and as demonstrated in T6, the TX/receive-beam pair may be once again satisfactorily aligned.

The proposed methods and procedures may be complaint with beam failure detection (BFD) and beam failure recovery (BFR) procedures, while providing a faster route to reaching a suitable user device receive-beam. The user device control flow to implement the methods and procedures in FIG. 6 is further shown in FIG. 7. In FIG. 7, the user device first collects from the gNB RRC configuration the inter-frequency measurement gap pattern and serving cell SSB burst pattern. Next, the user device detects whether the two patterns are time overlapping, whether in whole or in part. This can be achieved by comparing the slot offsets of serving cell SSB bursts and the slot offset of the configured measurement gaps. Next, when an overlap is detected, the user device selects a subset of periodic inter-frequency measurement gaps and takes advantage of them by performing intra-frequency serving cell SSB measurement with different receive-beam candidates. In this manner, a tradeoff is reached by adjusting the ratio between the number of inter-frequency measurement gaps used for SSB measurement and the total number of inter-frequency measurement gaps. The ratio can be adaptively adjusted based on serving cell measurement quality from non-gap durations. The ratio can also be adjusted based on the strengths and the number of detected strong inter-frequency neighboring cells in the cell database.

Next, the measured beam qualities within the selected gap duration (beamQuality_gap: such as SINR or/and RSRP), are compared with the measured beam qualities from non-gap durations (beamQuality_non_gap, such as SINR or/and RSRP). When the beamQuality_gap is significantly higher than the beamQuality_non_gap, as controlled by a predefined threshold Th, user device has reacquired a suitable receive-beam from the selected measurement gaps. In that case, the user device continues by adjusting the receive base beam by the best receive-beam candidate, which has been reacquired from the measurement gaps, and uses the updated receive base beam for follow-up PDSCH reception and follow-up beam refinement in non-gap durations. Otherwise, user device may continuously test other receive-beam candidates within those selected and alternatively employed measurement gaps.

As described herein, the reference signals used for receive-beam reacquisition can also periodically be CSI-RS resources which are quasi co-located (QCLed) with SSBs, as long as the CSI-RS pattern is time-overlapping with the configured inter-frequency measurement gap pattern.

As a further extension, the usage of allocated inter-frequency measurement can also be dynamically and adaptively selected for intra-frequency neighboring cell detection in a different angle direction. The selection can be jointly decided, for example, by serving cell DL PDSCH demodulation quality, inter-frequency neighboring cell measurement quality from the cell database, and/or intra-frequency neighboring cell measurement quality from the cell database.

Furthermore, and with respect to UEs with multiple concurrent RF receivers or multiple concurrent antenna arrays, the methods and procedures described herein may be employed such that inter-frequency neighboring cell measurement and intra-frequency serving cell receive-beam reacquisition can also be activated in parallel within a same allocated inter-frequency measurement gap. In that case, there is no degradation of inter-frequency handover performance.

The methods and procedures described herein may take advantage of a full or partial overlap between one or more DL beam acquisition resources (SSB or CSI-RS) and an allocated inter-frequency measurement gap pattern. Instead of always passively waiting for such an overlap, the user device may be configured to determine the testing time by transmitting to the base station at least one proposed slot offset parameter which is associated with at least one periodic DL beam management resource ID (SSB or CSI-RS), through higher layer signaling, such as, for example in RRC request messages. Accordingly, the network may determine the timing offset between the user device-indicated DL beam acquisition resource and the allocated periodic inter-frequency measurement gap pattern based on the indicated slot offset parameter. Naturally, the base station may also be given the freedom to ignore such a request due to its own considerations, such as, for example, scheduling optimizations.

According to another aspect of the disclosure, instead of making use of allocated inter-frequency measurement gaps, the user device may also autonomously identify a DL time gap in RRC_CONNECTED mode based on DL grant prediction. This can be achieved by counting the number of received DL grants from the DL slots which are time conflicting with the user device selected periodic DL beam acquisition resource (SSB/CSI-RS), within a historical sliding time window. The sliding window size can be scaled with the time periodicity of user device selected DL beam acquisition resource (SSB/CSI-RS).

As described herein, the user device may be configured to test an alternative candidate receive-beam during an interval between beam selection protocol transmissions. Because the beam selection protocol information is not transmitted during this period, the candidate receive-beams are tested against one or more alternative signals. According to one aspect of the disclosure, the alternative signal may be a downlink beam acquisition resource. This may include, but is not limited to, a synchronization signal. The synchronization signal may be part of a synchronization signal burst according to LTE or 5G. The signal may be a signal transmitted by a base station during a Physical Downlink Shared Channel Transmission or a Channel State Information Reference Signal (CSI-RS).

The testing may occur in an interval between beam selection protocol transmissions. The interval may correspond to a measurement gap. The interval may be recurrent. The interval may occur periodically. The period between intervals may be regular or irregular.

According to one aspect of the disclosure, the candidate receive-beam may be a wide receive-beam. As described herein, beam selection may be performed using wide beams and narrow beams. Although these two classes of beams are common, the methods and procedures described herein should not be understood to be limited to only wide beams and narrow beams, but may be implemented in beam selection procedures involving any number of beam selection size iterations.

The user device may be configured to select a candidate receive-beam different from a most-recently used receive-beam. For example, in the P1 stage, a base station and user device may agree on a matched set of wide transmit-beam from the base station and wide receive-beam from the user device. During the P2 and P3 steps, narrow transmit and receive-beams are selected, said narrow transmit and receive-beams corresponding to a portion of the wide transmit and wide receive-beams, respectively. When the signal quality corresponding to the receive-beam, whether a wide receive-beam or a corresponding narrow receive-beam, the user device may employ an alternative receive-beam according to an alternative receive-beam setting.

The user device may test candidate receive-beams during the interval between beam selection protocol transmissions, as described herein. The candidate receive-beam may be a receive-beam different from a current receive-beam. That is, the candidate receive-beam may be different from the receive-beam established in the P1 phase. The candidate receive-beam may differ from a receive-beam used in the P2 or P3 stages. That is, a narrow receive-beam utilized in the P3 stage, for example, may not correspond to any portion of the candidate receive-beam. By selecting a candidate receive-beam other than the receive-beam utilized in the current P1/P2/P3 process, it may be possible to select a candidate receive-beam that better corresponds with a changed position or orientation of the user device.

The candidate receive-beam may be selected by any means whatsoever. According to one aspect of the disclosure, the candidate receive-beam may be selected at random. According to another aspect of the disclosure, the candidate receive-beam may be selected according to a beam selection algorithm. The candidate receive-beam may be selected to correspond with a predetermined directional difference from the candidate receive-beam selected in the P1 stage, such as selecting a candidate receive-beam that is 45°, 90°, 135°, 180°, 225°, 270°, or 315° from the receive-beam selected in the P1 stage.

According to one aspect of the disclosure, during the gNB allocated inter-frequency measurement gaps, the user device may be configured to switch the radiofrequency receiver to a different central carrier frequency or even a different band, which is known as inter-frequency switching. The new frequency may be different from that of the serving cell downlink signal reception: Changing the carrier frequency may permit measurement of inter-frequency neighboring cells, such as to prepare for inter-frequency handover. A candidate receive beam may be tested during reception of the signal at the new frequency.

According to another aspect of the disclosure, the user device may use a portion of the gNB allocated inter-frequency gaps to switch the RX beam significantly but still in the same RF central frequency as for serving cell DL signal reception (which is known as intra-freq inter-beam switching), and make use of the DL SSBs from the serving cell. These may be time-overlapped with the allocated inter-frequency gaps for serving cell re-acquisition. Because there is no DL PDSCH/PDCCH scheduled during this gap, the user device is free to perform beam sweeping or beam testing during this time without risk of missing a transmission. This permits increased robustness of the wireless communication by discovering improved receive beam settings.

According to another aspect of the disclosure, the user device may use a portion of the gNB allocated inter-frequency gaps to switch the RX beam to be the opposite of the serving cell RX beams (intra-freq inter-beam) while still maintaining a carrier frequency as the serving cell. This permits the user device to detect and measure the intra-frequency neighboring cells which usually are not covered by the serving cell RX beam during non-gap portions.

According to another aspect of the disclosure, any of the devices and methods described herein may be selectively employed based on or more key performance indicators (KPI). On one hand, being able to test candidate receive beams allows for the user device to discover receive beam settings that are improved over a currently implemented receive beam setting, thereby improving wireless communication with the base station. On the other hand, when this occurs instead of performing cell search, this may reduce the chance of the user device discovering alternate and/or preferable cells that may provide improved wireless communication. The user device may be configured to implement any of the procedures described herein, including but not limited to the procedures described from five paragraphs to two paragraphs above the current paragraph based on one or more KPIs. The KPIs may be, without limitation, serving cell DL reception quality during non-gap durations; inter-frequency neighboring cell data base status (for example, whether a satisfactory neighboring cell has already been detected); and intra-frequency neighboring cell data base status (for example, whether a good neighboring cell detected has been detected).

Additional aspects of the disclosure will be described in the following examples.

In Example 1, a wireless communication device is disclosed comprising two or more antennas; one or more transceivers, configured to process wireless signal for one or more processors received via the two or more antennas; and one or more processors, configured to determine a timing of data transmissions within the wireless signal; determine a timing of intervals between beam selection protocol transmissions in the wireless signal; determine a testing period corresponding to an overlap of one data transmission selected from the data transmissions and one interval of the intervals; and measure a signal quality of the selected data transmission during the testing period using a candidate receive-beam setting from a plurality of predefined receive-beam settings for receiving the wireless signals via the two or more antennas.

In Example 2, the wireless communication device of Example 1 is disclosed, wherein the one data transmission is a downlink beam acquisition resource.

In Example 3, the wireless communication device of Example 2 is disclosed, wherein the one data transmission is a synchronization signal.

In Example 4, the wireless communication device of Example 3 is disclosed, wherein the one data transmission is a synchronization signal burst (SS Burst) according to LTE or 5G.

In Example 5, the wireless communication device of any one of Examples 1 to 4 is disclosed, wherein the one data transmission is transmitted by a base station during a Physical Downlink Shared Channel Transmission.

In Example 6, the wireless communication device of any one of Examples 1 to 4 is disclosed, wherein the one data transmission is a Channel State Information Reference Signal (CSI-RS).

In Example 7, the wireless communication device of any one of Examples 1 to 4 is disclosed, wherein the one interval is a Measurement Gap.

In Example 8, the wireless communication device of any one of Examples 1 to 4 is disclosed, wherein the one interval is an interval between beam selection protocol transmission iterations.

In Example 9, the wireless communication device of any one of Examples 1 to 8 is disclosed, wherein the candidate receive-beam is a wide receive-beam.

In Example 10, the wireless communication device of Example 9 is disclosed, further comprising selecting the candidate receive-beam to be different from a most recent wide receive-beam used in the beam selection protocol.

In Example 11, the wireless communication device of any one of Examples 1 to 8 is disclosed, wherein the candidate receive-beam is a narrow receive-beam.

In Example 12, the wireless communication device of Example 11 is disclosed, further comprising selecting the candidate receive-beam to be different from a most recent narrow receive-beam used in the beam selection protocol.

In Example 13, the wireless communication device of any one of Examples 1 to 12 is disclosed, further comprising selecting the candidate receive-beam at random.

In Example 14, the wireless communication device of any one of Examples 1 to 13 is disclosed, wherein the one or more processors are further configured to compare the measured signal quality corresponding to the candidate receive-beam with a predetermined threshold, and if the signal quality of the candidate receive-beam exceeds the predetermined threshold, implementing the candidate receive bean in a remainder of the beam selection protocol.

In Example 15, the wireless communication device of any one of Examples 1 to 13 is disclosed, wherein the one or more processors are further configured to compare the signal quality corresponding to the candidate receive-beam with a measured signal quality corresponding to a receive-beam previously used in the beam selection protocol, and if the signal quality corresponding to the candidate receive-beam is greater than the signal quality corresponding to the receive-beam previously used in the beam selection protocol, implementing the candidate receive bean in a remainder of the beam selection protocol.

In Example 16, the wireless communication device of Example 14 or 15 is disclosed, wherein implementing the candidate receive-beam includes performing a remainder of the beam selection protocol using the candidate receive-beam.

In Example 17, the wireless communication device of Example 14 or 15 is disclosed, wherein implementing the candidate receive-beam includes performing a remainder of the beam selection protocol using a narrow receive-beam corresponding to a portion of the candidate receive-beam.

In Example 18, the wireless communication device of Example 14 or 15 is disclosed, wherein implementing the candidate receive-beam includes performing a remainder of the beam selection protocol using one or more narrow receive-beams corresponding to the candidate receive-beam.

In Example 19, the wireless communication device of any one of Examples 14 to 18 is disclosed, wherein the signal quality is a Signal to Noise Ratio.

In Example 20, the wireless communication device of any one of Examples 14 to 18 is disclosed, wherein the signal quality is a received signal strength.

In Example 21, the wireless communication device of any one of Examples 1 to 20 is disclosed, further comprising testing a plurality of candidate receive-beams during a beam selection protocol.

In Example 22, the wireless communication device of any one of Examples 1 to 21 is disclosed, wherein determining the testing period includes comparing a slot offset of the one data transmission with a slot offset of the in interval.

In Example 23, the wireless communication device of any one of Examples 1 to 22 is disclosed, wherein the data transmission is transmitted by a base station.

In Example 24, the wireless communication device of any one of Examples 1 to 23 is disclosed, wherein the selected data transmission is transmitted at a carrier frequency on which a most recent beam selection protocol transmission was received.

In Example 25, the wireless communication device of any one of Examples 1 to 23 is disclosed, wherein two of the two or more antennas are arranged in substantially opposite orientations, and wherein the candidate receive-beam setting is a beamforming setting corresponding to an antenna in a substantially opposite orientation to an antenna to which a most recent receive beam setting corresponds.

In Example 26, the wireless communication device of Example 25 is disclosed, wherein the selected data transmission is transmitted at a carrier frequency on which a most recent beam selection protocol transmission was received.

In Example 27, the wireless communication device of Example 25 or 25 is disclosed, wherein a first primarily beamforming lobe corresponding to a gain and a direction of the candidate receive-beam setting, and a second primary beamforming lobe corresponding to a gain and a direction of a most recent receive beam setting do not overlap.

In Example 28, the wireless communication device of any one of Examples 1 to 27 is disclosed, wherein determining a timing of intervals between beam selection protocol transmissions in the wireless signal includes controlling the one or more transceivers to transmit to a network a candidate slot offset parameter for the interval, the slot offset parameter corresponding to a slot offset of the data transmissions.

In Example 29, the wireless communication device of any one of Examples 1 to 23 is disclosed, wherein the intervals between beam selection protocol transmissions include received transmissions of downlink information, and wherein the one or more processors are further configured to: determine a number of downlink grants in a predetermined time window; determine a channel quality corresponding to the data transmission; and when a predetermined criterion is met, to measure the signal quality of the selected data transmission during the testing period using a candidate receive-beam setting from a plurality of predefined receive-beam settings for receiving the wireless signals via the two or more antennas.

In Example 30, the wireless communication device of Example 29 is disclosed, wherein the predetermined criterion is the number of downlink grants in the predetermined window being above a predetermined threshold.

In Example 31, the wireless communication device of Example 29 is disclosed, wherein the predetermined criterion is the channel quality being above a predetermined threshold.

In Example 32, the wireless communication device of Example 29 is disclosed, wherein the predetermined criterion is both the number of downlink grants in the predetermined window being above a predetermined threshold and the channel quality being above a predetermined threshold.

In Example 33, the wireless communication device of any one of Examples 29 to 32 is disclosed, wherein the channel quality is a Channel Quality Indicator (CQI).

In Example 34, the wireless communication device of any one of Examples 29 to 33 is disclosed, wherein the one or more processors are further configured, when a predetermined criterion is not met, not to measure the signal quality of the selected data transmission during the testing period.

In Example 35, a wireless communication device is disclosed, comprising two or more antennas; one or more transceivers, configured to process wireless signal for one or more processors received via the two or more antennas; and one or more processors, configured to determine a timing of intervals between beam selection protocol transmissions at a first frequency in the wireless signal; determine a testing period corresponding to one interval of the intervals; control the one or more transmitters to change a reception frequency from the first frequency to a second frequency and; measure a signal quality of a data transmission on the second frequency during the testing period using a candidate receive-beam setting from a plurality of predefined receive-beam settings for receiving the wireless signals via the two or more antennas.

In Example 36, the wireless communication device of Example 35 is disclosed, wherein the second frequency is a different carrier frequency from the first frequency.

In Example 37, the wireless communication device of Example 35 or 36 is disclosed, wherein the second frequency is in a different carrier band from the first frequency.

In Example 38, the wireless communication device of any one of Examples 35 to 37 is disclosed, wherein the one interval is a Measurement Gap.

In Example 39, the wireless communication device of any one of Examples 35 to 38 is disclosed, wherein the one interval is an interval between beam selection protocol transmission iterations.

In Example 40, a method of wireless communication is disclosed, comprising determining a timing of data transmissions within the wireless signal; determining a timing of intervals between beam selection protocol transmissions in the wireless signal; determining a testing period corresponding to an overlap of one data transmission selected from the data transmissions and one interval of the intervals; and measuring a signal quality of the selected data transmission during the testing period using a candidate receive-beam setting from a plurality of predefined receive-beam settings for receiving the wireless signals via the two or more antennas.

In Example 41, the method of wireless communication of Example 40 is disclosed, wherein the one data transmission is a downlink beam acquisition resource.

In Example 42, the method of wireless communication of Example 41 is disclosed, wherein the one data transmission is a synchronization signal.

In Example 43, the method of wireless communication of Example 42 is disclosed, wherein the one data transmission is a synchronization signal burst (SS Burst) according to LTE or 5G.

In Example 44, the method of wireless communication of any one of Examples 40 to 43 is disclosed, wherein the one data transmission is transmitted by a base station during a Physical Downlink Shared Channel Transmission.

In Example 45, the method of wireless communication of any one of Examples 40 to 43 is disclosed, wherein the one data transmission is a Channel State Information Reference Signal (CSI-RS).

In Example 46, the method of wireless communication of any one of Examples 40 to 43 is disclosed, wherein the one interval is a Measurement Gap.

In Example 47, the method of wireless communication of any one of Examples 40 to 43 is disclosed, wherein the one interval is an interval between beam selection protocol transmission iterations.

In Example 48, the method of wireless communication of any one of Examples 40 to 47 is disclosed, wherein the candidate receive-beam is a wide receive-beam.

In Example 49, the method of wireless communication of Example 48 is disclosed, further comprising selecting the candidate receive-beam to be different from a most recent wide receive-beam used in the beam selection protocol.

In Example 50, the method of wireless communication of any one of Examples 40 to 47 is disclosed, wherein the candidate receive-beam is a narrow receive-beam.

In Example 51, the method of wireless communication of Example 50 is disclosed, further comprising selecting the candidate receive-beam to be different from a most recent narrow receive-beam used in the beam selection protocol.

In Example 52, the method of wireless communication of any one of Examples 40 to 51 is disclosed, further comprising selecting the candidate receive-beam at random.

In Example 53, the method of wireless communication of any one of Examples 40 to 52 is disclosed, further comprising comparing the measured signal quality corresponding to the candidate receive-beam with a predetermined threshold, and if the signal quality of the candidate receive-beam exceeds the predetermined threshold, implementing the candidate receive bean in a remainder of the beam selection protocol.

In Example 54, the method of wireless communication of any one of Examples 40 to 52 is disclosed, further comprising comparing the signal quality corresponding to the candidate receive-beam with a measured signal quality corresponding to a receive-beam previously used in the beam selection protocol, and if the signal quality corresponding to the candidate receive-beam is greater than the signal quality corresponding to the receive-beam previously used in the beam selection protocol, implementing the candidate receive bean in a remainder of the beam selection protocol.

In Example 55, the method of wireless communication of Example 53 or 54 is disclosed, wherein implementing the candidate receive-beam includes performing a remainder of the beam selection protocol using the candidate receive-beam.

In Example 56, the method of wireless communication of Example 53 or 54 is disclosed, wherein implementing the candidate receive-beam includes performing a remainder of the beam selection protocol using a narrow receive-beam corresponding to a portion of the candidate receive-beam.

In Example 57, the method of wireless communication of Example 53 or 54 is disclosed, wherein implementing the candidate receive-beam includes performing a remainder of the beam selection protocol using one or more narrow receive-beams corresponding to the candidate receive-beam.

In Example 58, the method of wireless communication of any one of Examples 53 to 57 is disclosed, wherein the signal quality is a Signal to Noise Ratio.

In Example 59, the method of wireless communication of any one of Examples 53 to 57 is disclosed, wherein the signal quality is a received signal strength.

In Example 60, the method of wireless communication of any one of Examples 40 to 59 is disclosed, further comprising testing a plurality of candidate receive-beams during a beam selection protocol.

In Example 61, the method of wireless communication of any one of Examples 40 to 60 is disclosed, wherein determining the testing period includes comparing a slot offset of the one data transmission with a slot offset of the in interval.

In Example 62, the method of wireless communication of any one of Examples 40 to 61 is disclosed, wherein the data transmission is transmitted by a base station.

In Example 63, the method of wireless communication of any one of Examples 40 to 62 is disclosed, wherein the selected data transmission is transmitted at a carrier frequency on which a most recent beam selection protocol transmission was received.

In Example 64, the method of wireless communication of any one of Examples 40 to 62 is disclosed, wherein the candidate receive-beam setting is a beamforming setting corresponding to an antenna in a substantially opposite orientation to an antenna to which a most recent receive beam setting corresponds.

In Example 65, the method of wireless communication of Example 64 is disclosed, wherein the selected data transmission is transmitted at a carrier frequency on which a most recent beam selection protocol transmission was received.

In Example 66, the method of wireless communication of Example 64 or 65 is disclosed, wherein a first primarily beamforming lobe corresponding to a gain and a direction of the candidate receive-beam setting, and a second primary beamforming lobe corresponding to a gain and a direction of a most recent receive beam setting do not overlap.

In Example 67, the method of wireless communication of any one of Examples 40 to 66 is disclosed, wherein determining a timing of intervals between beam selection protocol transmissions in the wireless signal includes transmitting to a network a candidate slot offset parameter for the interval, the slot offset parameter corresponding to a slot offset of the data transmissions.

In Example 68, the method of wireless communication of any one of Examples 40 to 67 is disclosed, wherein the intervals between beam selection protocol transmissions include received transmissions of downlink information, and further comprising determining a number of downlink grants in a predetermined time window; determining a channel quality corresponding to the data transmission; and when a predetermined criterion is met, measuring the signal quality of the selected data transmission during the testing period using a candidate receive-beam setting from a plurality of predefined receive-beam settings for receiving the wireless signals via the two or more antennas.

In Example 69, the method of wireless communication of Example 68 is disclosed, wherein the predetermined criterion is the number of downlink grants in the predetermined window being above a predetermined threshold.

In Example 70, the method of wireless communication of Example 68 is disclosed, wherein the predetermined criterion is the channel quality being above a predetermined threshold.

In Example 71, the method of wireless communication of Example 68 is disclosed, wherein the predetermined criterion is both the number of downlink grants in the predetermined window being above a predetermined threshold and the channel quality being above a predetermined threshold.

In Example 72, the method of wireless communication of any one of Examples 68 to 71 is disclosed, wherein the channel quality is a Channel Quality Indicator (CQI).

In Example 73, the method of wireless communication of any one of Examples 68 to 72 is disclosed, wherein the one or more processors are further configured, when a predetermined criterion is not met, not to measure the signal quality of the selected data transmission during the testing period.

In Example 74, a method of wireless communication is disclosed, comprising determining a timing of intervals between beam selection protocol transmissions at a first frequency in the wireless signal; determining a testing period corresponding to one interval of the intervals; controlling the one or more transmitters to change a reception frequency from the first frequency to a second frequency and; measuring a signal quality of a data transmission on the second frequency during the testing period using a candidate receive-beam setting from a plurality of predefined receive-beam settings for receiving the wireless signals via the two or more antennas.

In Example 75, the method of wireless communication of Example 74 is disclosed, wherein the second frequency is a different carrier frequency from the first frequency.

In Example 76, the method of wireless communication of Example 74 or 75 is disclosed, wherein the second frequency is in a different carrier band from the first frequency.

In Example 77, the method of wireless communication of any one of Examples 74 to 76 is disclosed, wherein the one interval is a Measurement Gap.

In Example 78, the method of wireless communication of any one of Examples 74 to 77 is disclosed, wherein the one interval is an interval between beam selection protocol transmission iterations.

In Example 79, a means for wireless communication is disclosed comprising two or more antennas; one or more transmission and reception means, configured to process wireless signal for one or more processing means received via the two or more antennas; and one or more processing means, configured to determine a timing of data transmissions within the wireless signal; determine a timing of intervals between beam selection protocol transmissions in the wireless signal; determine a testing period corresponding to an overlap of one data transmission selected from the data transmissions and one interval of the intervals; and measure a signal quality of the selected data transmission during the testing period using a candidate receive-beam setting from a plurality of predefined receive-beam settings for receiving the wireless signals via the two or more antennas.

In Example 80, the means for wireless communication of Example 79 is disclosed, wherein the one data transmission is a downlink beam acquisition resource.

In Example 81, the means for wireless communication of Example 80 is disclosed, wherein the one data transmission is a synchronization signal.

In Example 82, the means for wireless communication of Example 81 is disclosed, wherein the one data transmission is a synchronization signal burst (SS Burst) according to LTE or 5G.

In Example 83, the means for wireless communication of any one of Examples 79 to 82 is disclosed, wherein the one data transmission is transmitted by a base station during a Physical Downlink Shared Channel Transmission.

In Example 84, the means for wireless communication of any one of Examples 79 to 82 is disclosed, wherein the one data transmission is a Channel State Information Reference Signal (CSI-RS).

In Example 85, the means for wireless communication of any one of Examples 79 to 82 is disclosed, wherein the one interval is a Measurement Gap.

In Example 86, the means for wireless communication of any one of Examples 79 to 82 is disclosed, wherein the one interval is an interval between beam selection protocol transmission iterations.

In Example 87, the means for wireless communication of any one of Examples 79 to 86 is disclosed, wherein the candidate receive-beam is a wide receive-beam.

In Example 88, the means for wireless communication of Example 87 is disclosed, further comprising selecting the candidate receive-beam to be different from a most recent wide receive-beam used in the beam selection protocol.

In Example 89, the means for wireless communication of any one of Examples 79 to 88 is disclosed, wherein the candidate receive-beam is a narrow receive-beam.

In Example 90, the means for wireless communication of Example 89 is disclosed, further comprising selecting the candidate receive-beam to be different from a most recent narrow receive-beam used in the beam selection protocol.

In Example 91, the means for wireless communication of any one of Examples 79 to 90 is disclosed, further comprising selecting the candidate receive-beam at random.

In Example 92, the means for wireless communication of any one of Examples 79 to 91 is disclosed, wherein the one or more processing means are further configured to compare the measured signal quality corresponding to the candidate receive-beam with a predetermined threshold, and if the signal quality of the candidate receive-beam exceeds the predetermined threshold, implementing the candidate receive bean in a remainder of the beam selection protocol.

In Example 93, the means for wireless communication of any one of Examples 79 to 91 is disclosed, wherein the one or more processing means are further configured to compare the signal quality corresponding to the candidate receive-beam with a measured signal quality corresponding to a receive-beam previously used in the beam selection protocol, and if the signal quality corresponding to the candidate receive-beam is greater than the signal quality corresponding to the receive-beam previously used in the beam selection protocol, implementing the candidate receive bean in a remainder of the beam selection protocol.

In Example 94, the means for wireless communication of Example 92 or 93 is disclosed, wherein implementing the candidate receive-beam includes performing a remainder of the beam selection protocol using the candidate receive-beam.

In Example 95, the means for wireless communication of Example 92 or 93 is disclosed, wherein implementing the candidate receive-beam includes performing a remainder of the beam selection protocol using a narrow receive-beam corresponding to a portion of the candidate receive-beam.

In Example 96, the means for wireless communication of Example 92 or 93 is disclosed, wherein implementing the candidate receive-beam includes performing a remainder of the beam selection protocol using one or more narrow receive-beams corresponding to the candidate receive-beam.

In Example 97, the means for wireless communication of any one of Examples 92 to 96 is disclosed, wherein the signal quality is a Signal to Noise Ratio.

In Example 98, the means for wireless communication of any one of Examples 92 to 96 is disclosed, wherein the signal quality is a received signal strength.

In Example 99, the means for wireless communication of any one of Examples 79 to 98 is disclosed, further comprising testing a plurality of candidate receive-beams during a beam selection protocol.

In Example 100, the means for wireless communication of any one of Examples 79 to 99 is disclosed, wherein determining the testing period includes comparing a slot offset of the one data transmission with a slot offset of the in interval.

In Example 101, the means for wireless communication of any one of Examples 79 to 100 is disclosed, wherein the data transmission is transmitted by a base station.

In Example 102, the means for wireless communication of any one of Examples 79 to 101 is disclosed, wherein the selected data transmission is transmitted at a carrier frequency on which a most recent beam selection protocol transmission was received.

In Example 103, the means for wireless communication of any one of Examples 79 to 102 is disclosed, wherein two of the two or more antennas are arranged in substantially opposite orientations, and wherein the candidate receive-beam setting is a beamforming setting corresponding to an antenna in a substantially opposite orientation to an antenna to which a most recent receive beam setting corresponds.

In Example 104, the means for wireless communication of Example 103 is disclosed, wherein the selected data transmission is transmitted at a carrier frequency on which a most recent beam selection protocol transmission was received.

In Example 105, the means for wireless communication of Example 103 or 104 is disclosed, wherein a first primarily beamforming lobe corresponding to a gain and a direction of the candidate receive-beam setting, and a second primary beamforming lobe corresponding to a gain and a direction of a most recent receive beam setting do not overlap.

In Example 106, the means for wireless communication of any one of Examples 79 to 105 is disclosed, wherein determining a timing of intervals between beam selection protocol transmissions in the wireless signal includes controlling the one or more transmission and reception means to transmit to a network a candidate slot offset parameter for the interval, the slot offset parameter corresponding to a slot offset of the data transmissions.

In Example 107, the means for wireless communication of any one of Examples 79 to 101 is disclosed, wherein the intervals between beam selection protocol transmissions include received transmissions of downlink information, and wherein the one or more processing means are further configured to: determine a number of downlink grants in a predetermined time window; determine a channel quality corresponding to the data transmission; and when a predetermined criterion is met, to measure the signal quality of the selected data transmission during the testing period using a candidate receive-beam setting from a plurality of predefined receive-beam settings for receiving the wireless signals via the two or more antennas.

In Example 108, the means for wireless communication of Example 107 is disclosed, wherein the predetermined criterion is the number of downlink grants in the predetermined window being above a predetermined threshold.

In Example 109, the means for wireless communication of Example 107 is disclosed, wherein the predetermined criterion is the channel quality being above a predetermined threshold.

In Example 110, the means for wireless communication of Example 107 is disclosed, wherein the predetermined criterion is both the number of downlink grants in the predetermined window being above a predetermined threshold and the channel quality being above a predetermined threshold.

In Example 111, the means for wireless communication of any one of Examples 107 to 110 is disclosed, wherein the channel quality is a Channel Quality Indicator (CQI).

In Example 112, the means for wireless communication of any one of Examples 107 to 111 is disclosed, wherein the one or more processing means are further configured, when a predetermined criterion is not met, not to measure the signal quality of the selected data transmission during the testing period.

In Example 113, a means for wireless communication is disclosed, comprising two or more antennas; one or more transmission and reception means, configured to process wireless signal for one or more processing means received via the two or more antennas; and one or more processing means, configured to: determine a timing of intervals between beam selection protocol transmissions at a first frequency in the wireless signal; determine a testing period corresponding to one interval of the intervals; control the one or more transmitters to change a reception frequency from the first frequency to a second frequency and; measure a signal quality of a data transmission on the second frequency during the testing period using a candidate receive-beam setting from a plurality of predefined receive-beam settings for receiving the wireless signals via the two or more antennas.

In Example 114, a means for wireless communication of Example 113 is disclosed, wherein the second frequency is a different carrier frequency from the first frequency.

In Example 115, a means for wireless communication of Example 113 or 114 is disclosed, wherein the second frequency is in a different carrier band from the first frequency.

In Example 116, a means for wireless communication of any one of Examples 113 to 115 is disclosed, wherein the one interval is a Measurement Gap.

In Example 117, a means for wireless communication of any one of Examples 113 to 116 is disclosed, wherein the one interval is an interval between beam selection protocol transmission iterations.

In Example 118, a non-transient computer-readable medium is disclosed, configured to cause one or more processors to perform the method of any one of Examples 40 to 78.

In Example 119, a device comprising one or more processors is disclosed, the one or more processors being configured to receive from one or more transceivers a wireless signal that was received from two or more antennas; determine a timing of data transmissions within the wireless signal; determine a timing of intervals between beam selection protocol transmissions in the wireless signal; determine a testing period corresponding to an overlap of one data transmission selected from the data transmissions and one interval of the intervals; and measure a signal quality of the selected data transmission during the testing period using a candidate receive-beam setting from a plurality of predefined receive-beam settings for receiving the wireless signals via the two or more antennas.

In Example 120, the device of Example 119 is disclosed, wherein the one or more processors are baseband processors.

In Example 121, a device comprising one or more processors is disclosed, the one or more processors being configured to receive from one or more transceivers a wireless signal that was received from two or more antennas; determine a timing of intervals between beam selection protocol transmissions at a first frequency in the wireless signal; determine a testing period corresponding to one interval of the intervals; control the one or more transmitters to change a reception frequency from the first frequency to a second frequency and; measure a signal quality of a data transmission on the second frequency during the testing period using a candidate receive-beam setting from a plurality of predefined receive-beam settings for receiving the wireless signals via the two or more antennas.

In Example 122, the device of Example 121 is disclosed, wherein the one or more processors are baseband processors.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

What is claimed is:

1. A device comprising one or more processors configured to:
   receive from one or more transceivers a wireless signal that was received from two or more antennas;
   determine a timing of data transmissions within the wireless signal;
   determine a timing of intervals between beam selection protocol transmissions in the wireless signal;
   determine a testing period corresponding to an overlap of one data transmission selected from the data transmissions and one interval of the intervals; and
   measure a signal quality of the selected data transmission during the testing period using a candidate receive-beam setting from a plurality of predefined receive-beam settings for receiving the wireless signals via the two or more antennas;
   wherein the one or more processors are further configured to compare the measured signal quality corresponding to the candidate receive-beam with a predetermined threshold, and if the signal quality of the candidate receive-beam exceeds the predetermined threshold, implement the candidate receive bean in a remainder of the beam selection protocol.

2. The device of claim 1, wherein the one data transmission is a downlink beam acquisition resource or synchronization signal.

3. The device of claim 1, wherein the one interval is a Measurement Gap.

4. The device of claim 1, wherein the candidate receive-beam is a wide receive-beam.

5. The device of claim 1, wherein the one or more processors are further configured to compare the signal quality corresponding to the candidate receive-beam with a measured signal quality corresponding to a receive-beam previously used in the beam selection protocol, and if the signal quality corresponding to the candidate receive-beam is greater than the signal quality corresponding to the receive-beam previously used in the beam selection protocol, implementing the candidate receive bean in a remainder of the beam selection protocol.

6. The device of claim 5, wherein implementing the candidate receive-beam comprises performing a remainder of the beam selection protocol using the candidate receive-beam or a narrow receive-beam corresponding to a portion of the candidate receive-beam.

7. The device of claim 5, wherein implementing the candidate receive-beam comprises performing a remainder of the beam selection protocol using one or more narrow receive-beams corresponding to the candidate receive-beam.

8. The device of claim 1, wherein determining the testing period comprises comparing a slot offset of the one data transmission with a slot offset of the in interval.

9. The device of claim 1, wherein two of the two or more antennas are arranged in substantially opposite orientations, and wherein the candidate receive-beam setting is a beamforming setting corresponding to an antenna in a substantially opposite orientation to an antenna to which a most recent receive beam setting corresponds.

10. The device of claim 1, wherein determining a timing of intervals between beam selection protocol transmissions in the wireless signal comprises controlling the one or more transceivers to transmit to a network a candidate slot offset parameter for the interval, the slot offset parameter corresponding to a slot offset of the data transmissions.

11. The device of claim 1, wherein the intervals between beam selection protocol transmissions comprise received transmissions of downlink information, and wherein the one or more processors are further configured to: determine a number of downlink grants in a predetermined time window; determine a channel quality corresponding to the data transmission; and when one or more predetermined criteria are met, to measure the signal quality of the selected data transmission during the testing period using a candidate receive-beam setting from a plurality of predefined receive-beam settings for receiving the wireless signals via the two or more antennas.

12. A method of wireless communication comprising:
    determining a timing of data transmissions within the wireless signal;
    determining a timing of intervals between beam selection protocol transmissions in the wireless signal;

determining a testing period corresponding to an overlap of one data transmission selected from the data transmissions and one interval of the intervals; and measuring a signal quality of the selected data transmission during the testing period using a candidate receive-beam setting from a plurality of predefined receive-beam settings for receiving the wireless signals via the two or more antennas;

wherein the one data transmission is any one of a downlink beam acquisition resource;

a synchronization signal; or a synchronization signal burst (SS Burst) according to L or 5G.

13. The method of wireless communication of claim 12, wherein the one interval is an interval between beam selection protocol transmission iterations.

14. The method of wireless communication of claim 12, further comprising selecting the candidate receive-beam to be different from a most recent wide receive-beam used in the beam selection protocol.

15. The method of wireless communication of claim 12, further comprising comparing the measured signal quality corresponding to the candidate receive-beam with a predetermined threshold, and if the signal quality of the candidate receive-beam exceeds the predetermined threshold, implementing the candidate receive bean in a remainder of the beam selection protocol.

16. The method of wireless communication of claim 12, further comprising comparing the signal quality corresponding to the candidate receive-beam with a measured signal quality corresponding to a receive-beam previously used in the beam selection protocol, and if the signal quality corresponding to the candidate receive-beam is greater than the signal quality corresponding to the receive-beam previously used in the beam selection protocol, implementing the candidate receive bean in a remainder of the beam selection protocol.

17. The method of wireless communication of claim 12, wherein the intervals between beam selection protocol transmissions comprise received transmissions of downlink information, and further comprising determining a number of downlink grants in a predetermined time window; determining a channel quality corresponding to the data transmission; and when a predetermined criterion is met, measuring the signal quality of the selected data transmission during the testing period using a candidate receive-beam setting from a plurality of predefined receive-beam settings for receiving the wireless signals via the two or more antennas.

18. The method of wireless communication of claim 17, wherein the predetermined criterion is the number of downlink grants in the predetermined window being above a predetermined threshold.

19. The method of wireless communication of claim 17, wherein the predetermined criterion is the channel quality being above a predetermined threshold.

20. The method of wireless communication of claim 17, wherein the predetermined criterion is both the number of downlink grants in the predetermined window being above a predetermined threshold and the channel quality being above a predetermined threshold.

21. The method of wireless communication of claim 12, wherein the one or more processors are further configured, when a predetermined criterion is not met, not to measure the signal quality of the selected data transmission during the testing period.

22. A non-transitory computer-readable medium, comprising instructions which, if executed, are configured to cause one or more processors to:

determine a timing of data transmissions within the wireless signal;

determine a timing of intervals between beam selection protocol transmissions in the wireless signal;

determine a testing period corresponding to an overlap of one data transmission selected from the data transmissions and one interval of the intervals; and measure a signal quality of the selected data transmission during the testing period using a candidate receive-beam setting from a plurality of predefined receive-beam settings for receiving the wireless signals via the two or more antennas;

wherein the instructions are further configured to cause the one or more processors to compare the measured signal quality corresponding to the candidate receive-beam with a predetermined threshold, and if the signal quality of the candidate receive-beam exceeds the predetermined threshold, and implement the candidate receive bean in a remainder of the beam selection protocol.

* * * * *

UNITED STATES PATENT AND TRADEMARK OFFICE
CERTIFICATE OF CORRECTION

PATENT NO. : 11,588,540 B2
APPLICATION NO. : 16/973773
DATED : February 21, 2023
INVENTOR(S) : Zhibin Yu et al.

It is certified that error appears in the above-identified patent and that said Letters Patent is hereby corrected as shown below:

In the Claims

Claim 12, Column 31, Line 12, change "L or 5G" to --LTE or 5G--

Signed and Sealed this
Eighteenth Day of April, 2023

Katherine Kelly Vidal
*Director of the United States Patent and Trademark Office*